(12) United States Patent
Yamamoto

(10) Patent No.: US 11,959,253 B2
(45) Date of Patent: Apr. 16, 2024

(54) EXCAVATOR AND INFORMATION PROCESSING APPARATUS

(71) Applicant: SUMITOMO CONSTRUCTION MACHINERY CO., LTD., Tokyo (JP)

(72) Inventor: Takashi Yamamoto, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 683 days.

(21) Appl. No.: 17/116,200

(22) Filed: Dec. 9, 2020

(65) Prior Publication Data
US 2021/0087794 A1  Mar. 25, 2021

Related U.S. Application Data

(63) Continuation of application No. PCT/JP2019/021051, filed on May 28, 2019.

(30) Foreign Application Priority Data

Jun. 19, 2018 (JP) ................. 2018-116455

(51) Int. Cl.
*G06F 7/70* (2006.01)
*B60R 1/27* (2022.01)
(Continued)

(52) U.S. Cl.
CPC ............... *E02F 9/26* (2013.01); *B60R 1/27* (2022.01); *B60R 1/31* (2022.01); *E02F 3/32* (2013.01);
(Continued)

(58) Field of Classification Search
CPC ..... E02F 9/24; E02F 9/264; E02F 9/26; E02F 3/32; E02F 9/2029; E02F 9/2033;
(Continued)

(56) References Cited

U.S. PATENT DOCUMENTS 5,701,691 A * 12/1997 Watanabe ............... E02F 3/435
701/50
5,752,333 A * 5/1998 Nakagawa ............. E02F 3/437
701/50
(Continued)

FOREIGN PATENT DOCUMENTS

CA 2989984 C * 11/2020 ............... E02F 9/20
EP 2492404 8/2012
(Continued)

OTHER PUBLICATIONS

Le, Quang Hoan, et al. "Development of the flexible observation system for a virtual reality excavator using the head tracking system." 2015 15th International Conference on Control, Automation and Systems (ICCAS). IEEE, 2015. (Year: 2015).*

(Continued)

*Primary Examiner* — Cuong H Nguyen
(74) *Attorney, Agent, or Firm* — IPUSA, PLLC

(57) ABSTRACT

An excavator includes a lower traveling structure, an upper swing structure swingably mounted on the lower traveling structure, an attachment attached to the upper swing structure, a display device, and a hardware processor. The display device is configured to display multiple ranges including a first range and a second range lower in stability degree than the first range in the working range of the attachment such that the multiple ranges are distinguishable. The hardware processor is configured to determine a setting with respect to the multiple ranges.

16 Claims, 20 Drawing Sheets

(51) Int. Cl.
*B60R 1/31* (2022.01)
*E02F 3/32* (2006.01)
*E02F 9/20* (2006.01)
*E02F 9/24* (2006.01)
*E02F 9/26* (2006.01)

(52) U.S. Cl.
CPC ............... *E02F 9/205* (2013.01); *E02F 9/24* (2013.01); *B60R 2300/105* (2013.01); *B60R 2300/207* (2013.01); *B60R 2300/302* (2013.01)

(58) Field of Classification Search
CPC ......... E02F 9/2296; E02F 9/205; E02F 3/435; B60R 1/00; B60R 2300/105; B60R 2300/207; B60R 2300/302
USPC .......................................................... 701/50
See application file for complete search history.

(56) References Cited

U.S. PATENT DOCUMENTS

| | | | | | |
|---|---|---|---|---|---|
| 5,822,891 | A | * | 10/1998 | Fujishima | E02F 9/2033 701/50 |
| 5,835,874 | A | * | 11/1998 | Hirata | E02F 3/301 60/426 |
| 5,957,989 | A | * | 9/1999 | Egawa | E02F 9/2033 701/50 |
| 6,169,948 | B1 | * | 1/2001 | Fujishima | E02F 9/26 340/684 |
| 6,275,757 | B1 | * | 8/2001 | Watanabe | E02F 9/2296 37/234 |
| 7,778,756 | B2 | * | 8/2010 | Hartwick | E02F 9/26 701/50 |
| 9,518,370 | B2 | | 12/2016 | Tsukamoto | |
| 9,824,274 | B2 | | 11/2017 | Takeuchi | |
| 2013/0066527 | A1 | | 3/2013 | Mizuochi et al. | |
| 2014/0149094 | A1 | * | 5/2014 | Takeuchi | G06V 20/53 703/6 |
| 2018/0094408 | A1 | | 4/2018 | Shintani et al. | |
| 2018/0230678 | A1 | * | 8/2018 | Taira | B60R 1/00 |
| 2019/0017248 | A1 | * | 1/2019 | Okada | E02F 9/20 |
| 2019/0168609 | A1 | * | 6/2019 | Mianzo | B60W 50/08 |
| 2020/0318322 | A1 | * | 10/2020 | Yamada | E02F 9/0858 |

FOREIGN PATENT DOCUMENTS

| | | | |
|---|---|---|---|
| JP | H08-269998 | 10/1996 | |
| JP | H10-219749 | 8/1998 | |
| JP | 2009-197436 | 9/2009 | |
| JP | 2010-138657 | 6/2010 | |
| JP | 2013-036243 | 2/2013 | |
| JP | 2013-113044 | 6/2013 | |
| JP | 2014-106585 | 6/2014 | |
| JP | 2014-122510 | 7/2014 | |
| JP | 2016-183534 | 10/2016 | |
| JP | 6096980 B2 * | 3/2017 | ......... B60R 16/0231 |
| JP | 2017-071914 | 4/2017 | |
| WO | 2017/170555 | 10/2017 | |

OTHER PUBLICATIONS

Yoshida, Hiroshi, et al. "Practical full automation of excavation and loading for hydraulic excavators in indoor environments." 2021 IEEE 17th International Conference on Automation Science and Engineering (CASE). IEEE, 2021.*

Sitompul, Taufik Akbar, Markus Wallmyr, and Rikard Lindell. "Conceptual design and evaluation of windshield displays for excavators." Multimodal Technologies and Interaction 4.4 : 86 (Year: 2020).*

Le, Quang Hoan, et al. "Development of the flexible observation system for a virtual reality excavator using the head tracking system." 2015 15th International Conference on Control, Automation and Systems (ICCAS). IEEE, (Year: 2015).*

Seo, J. W., Haas, C., & Saidi, K. (2007). Graphical modeling and simulation for design and control of a tele-operated clinker clearing robot. Automation in construction, 16(1), 96-106 (Year: 2007).*

Harms Looström, Julia, and Emma Frisk. "Bird's-eye view vision-system for heavy vehicles with integrated human-detection." (Year: 2021).*

International Search Report for PCT/JP2019/021051 dated Jul. 9, 2019.

* cited by examiner

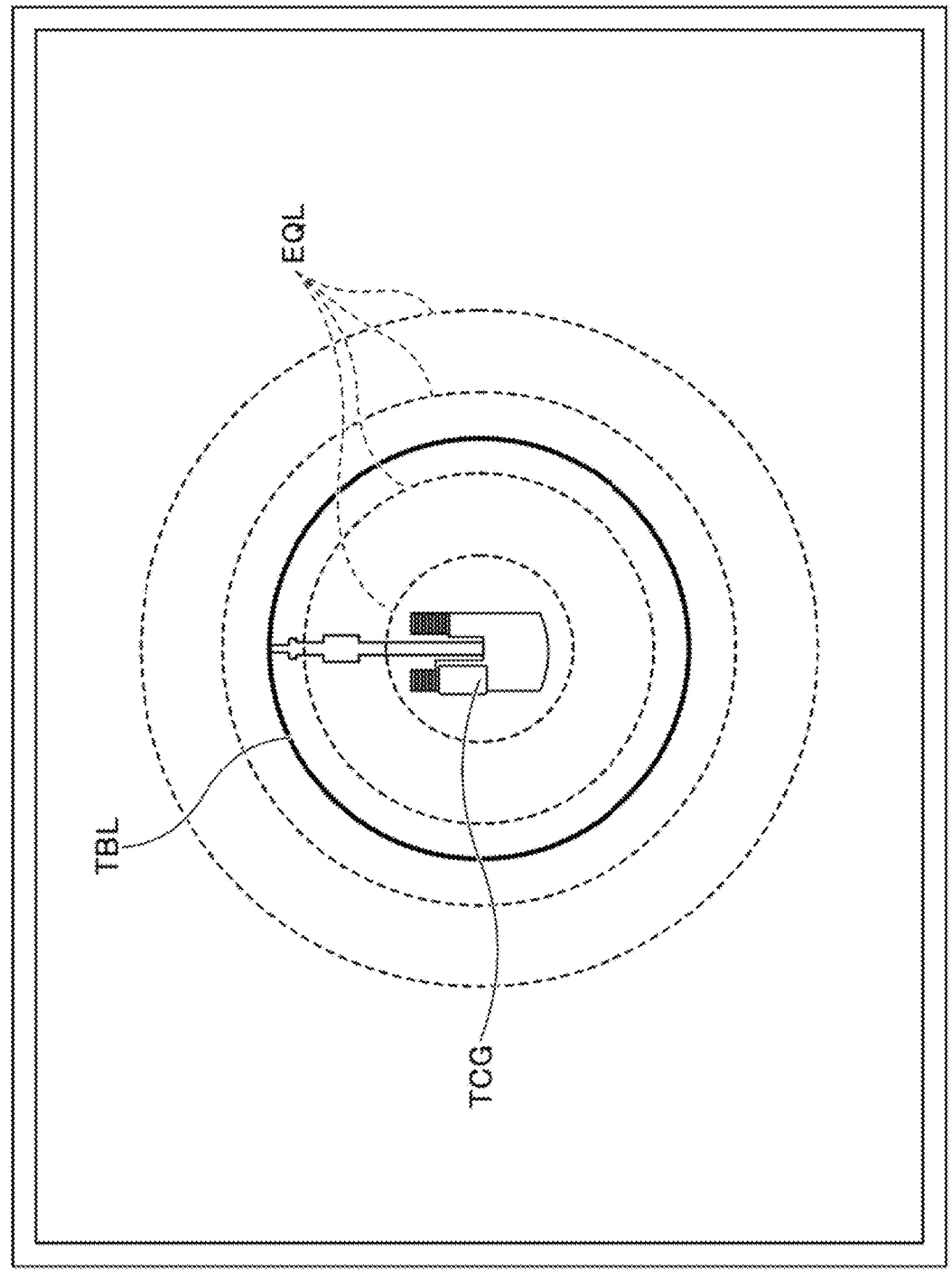

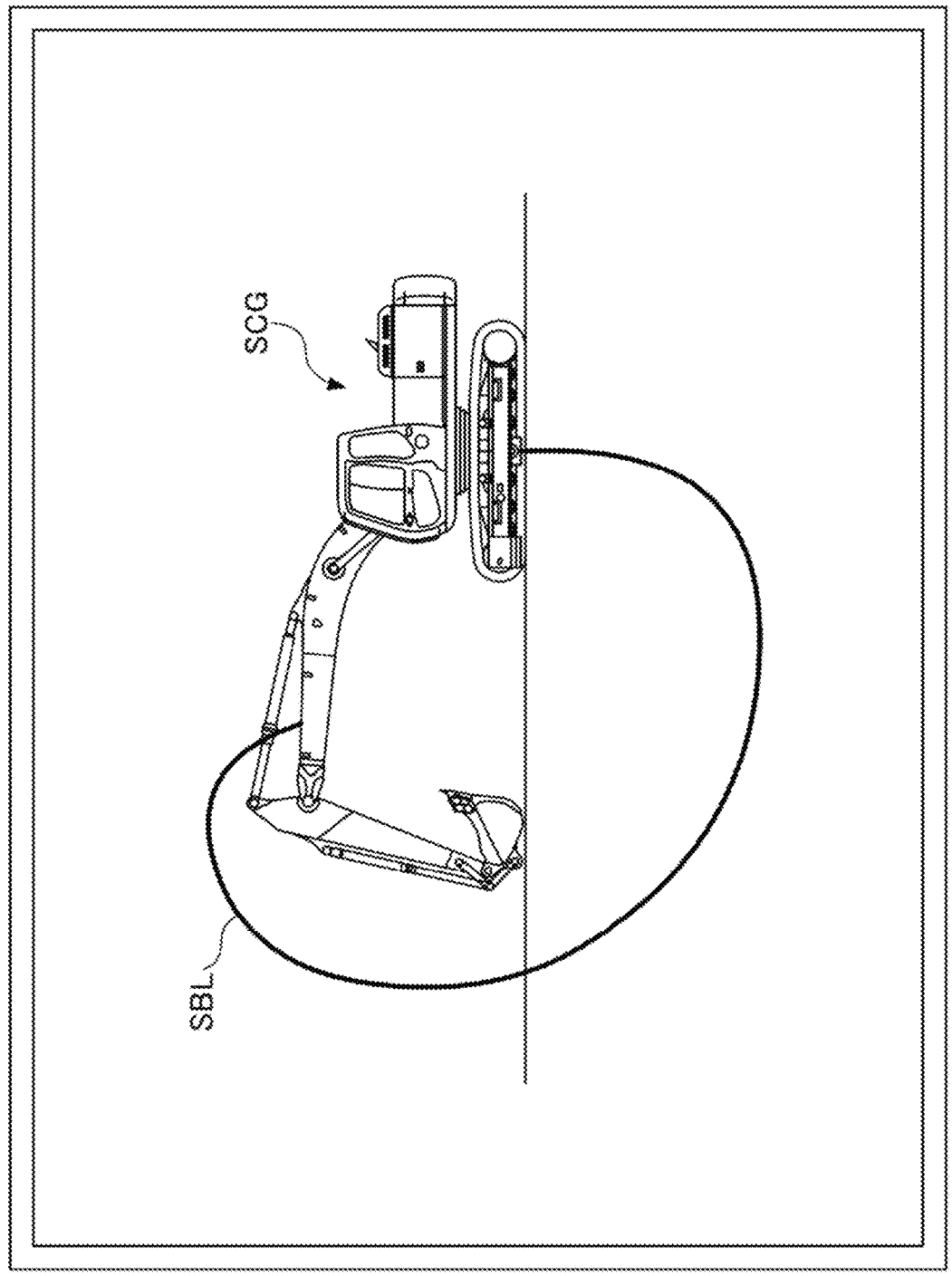

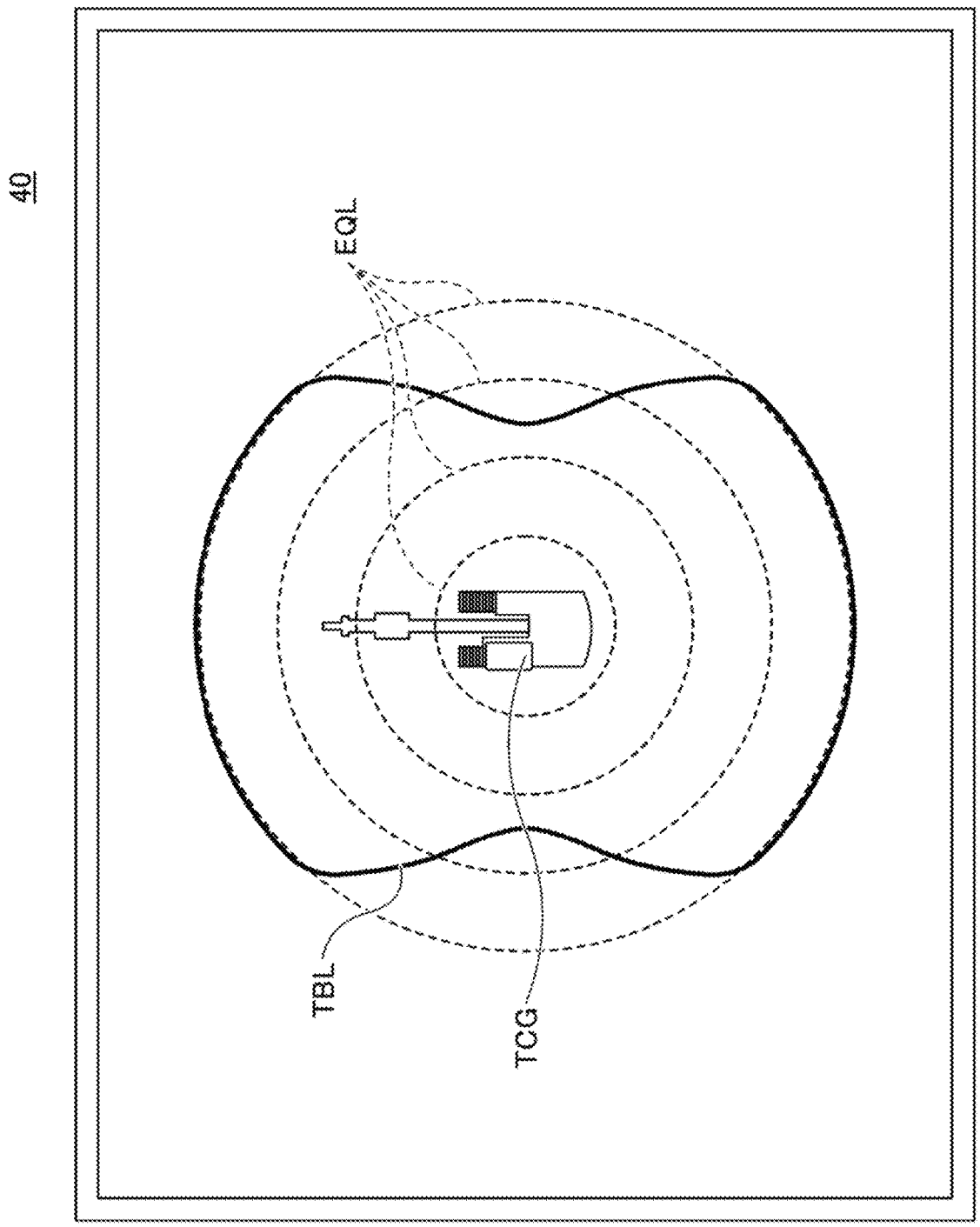

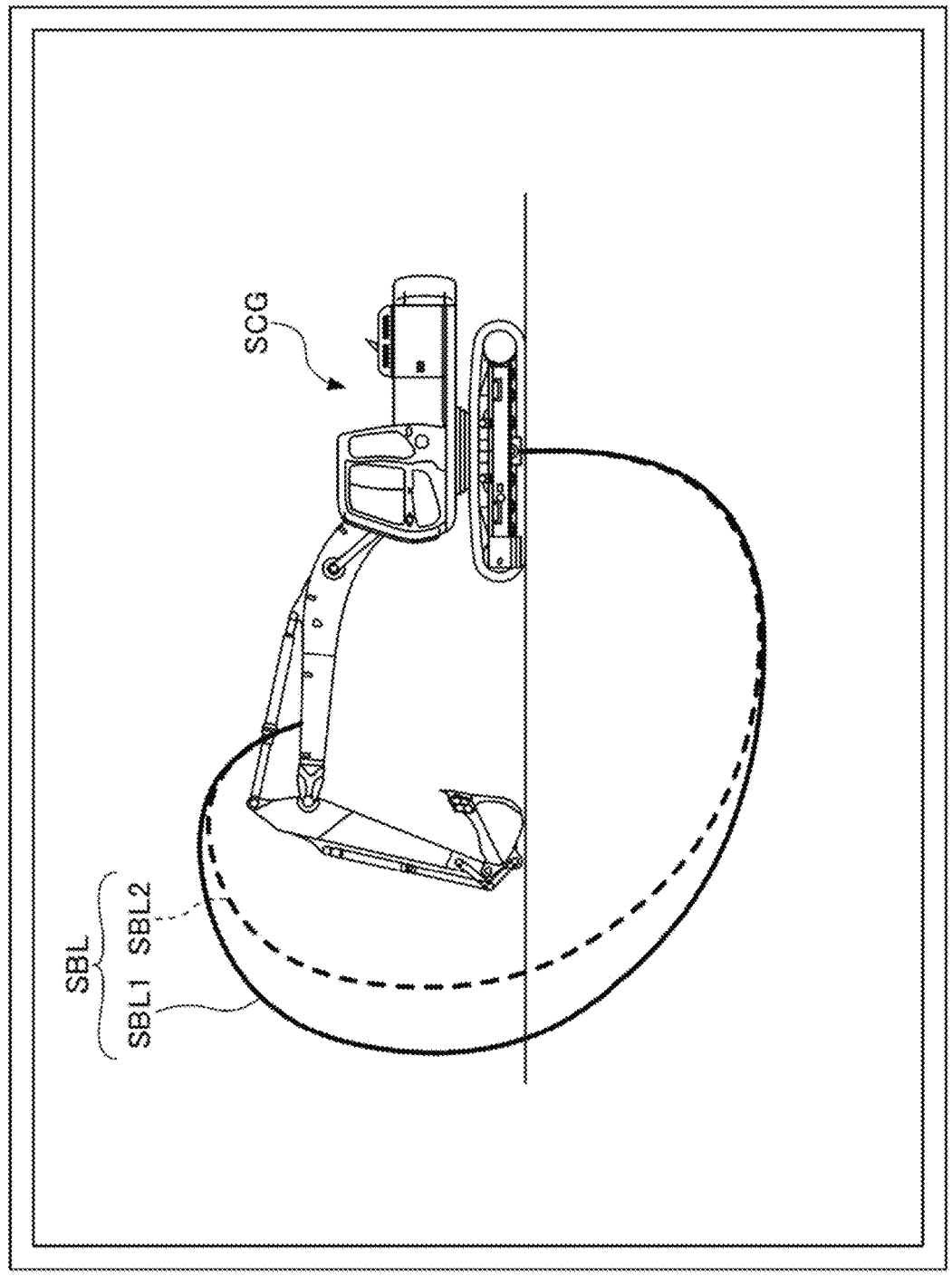

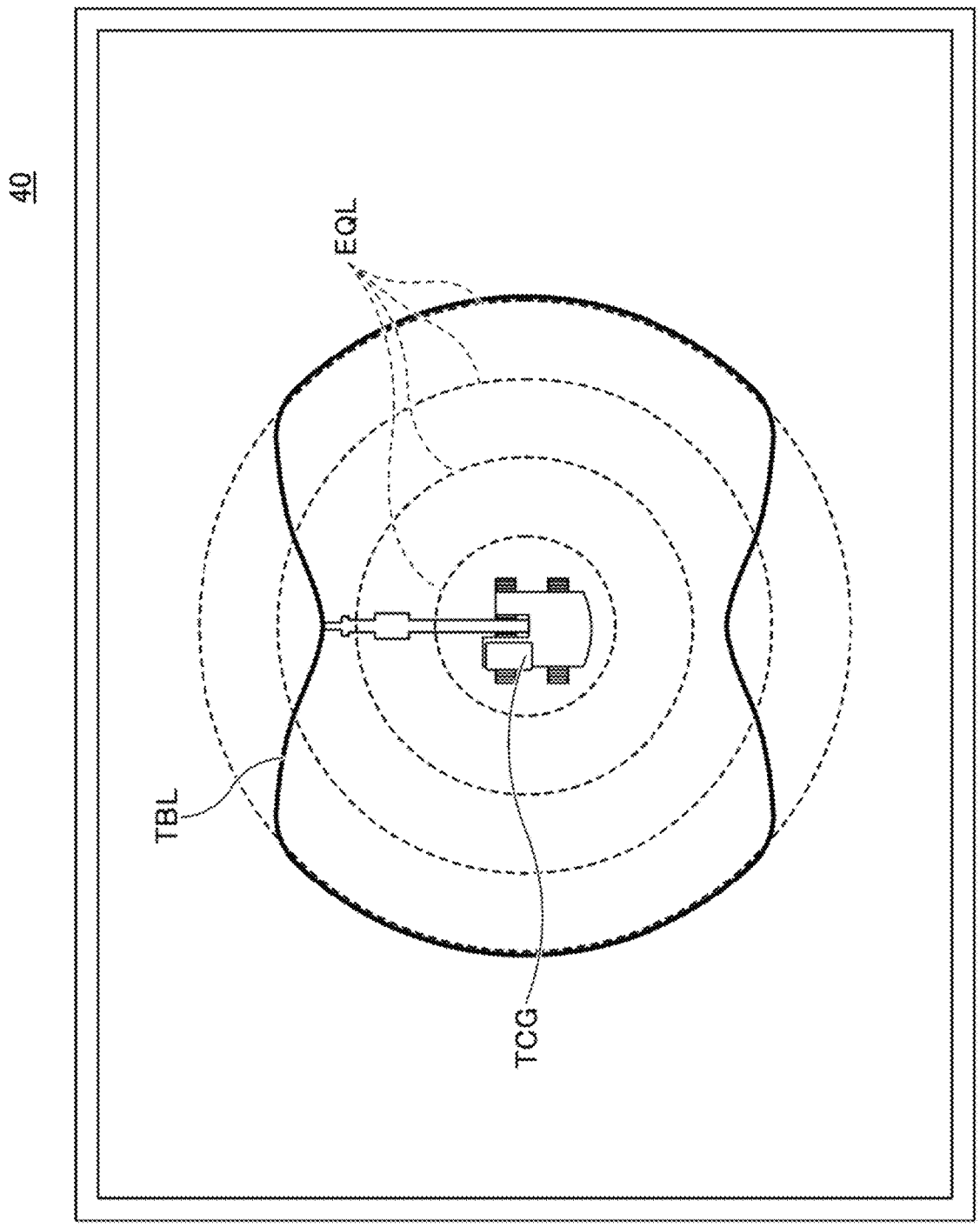

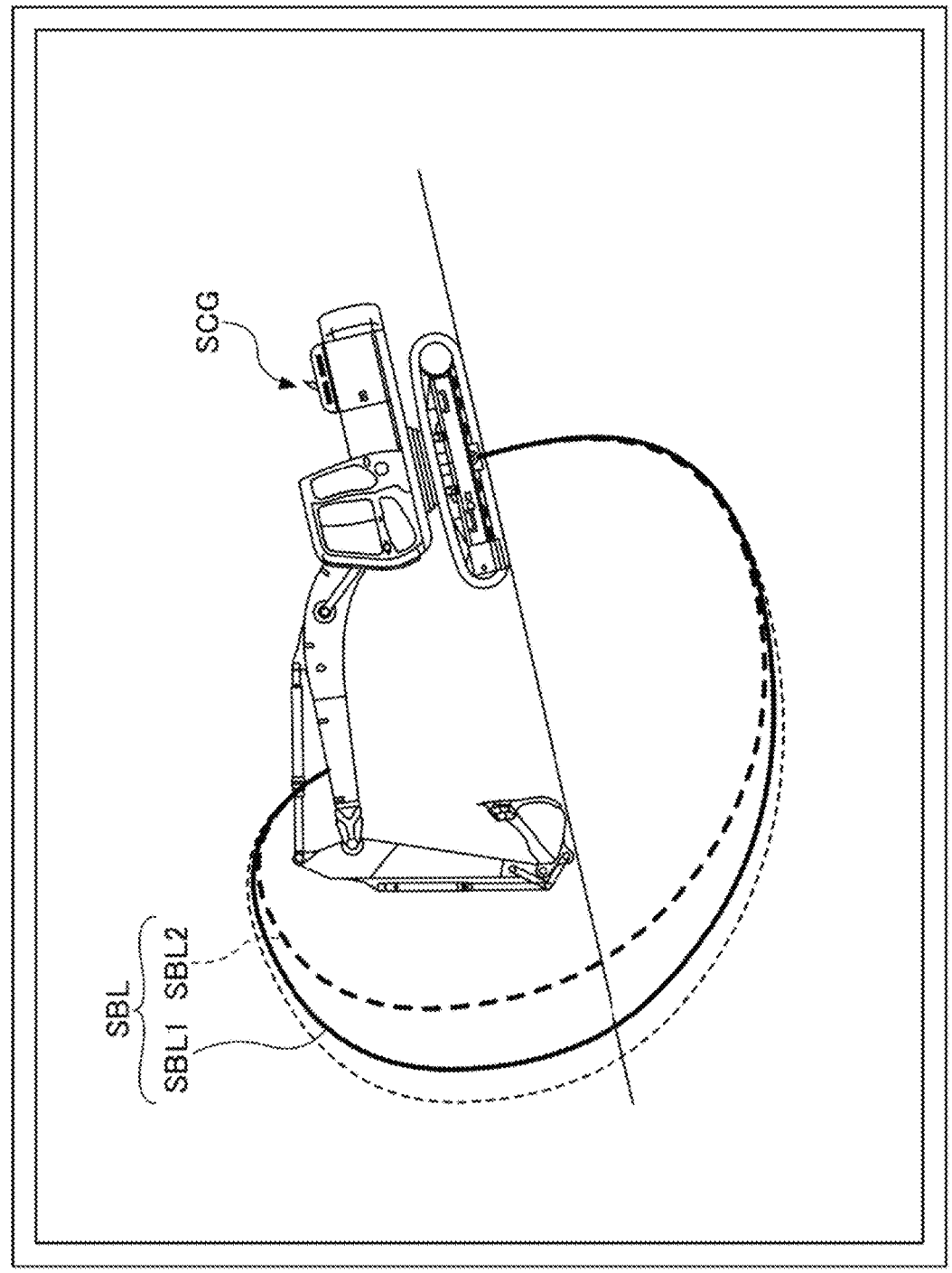

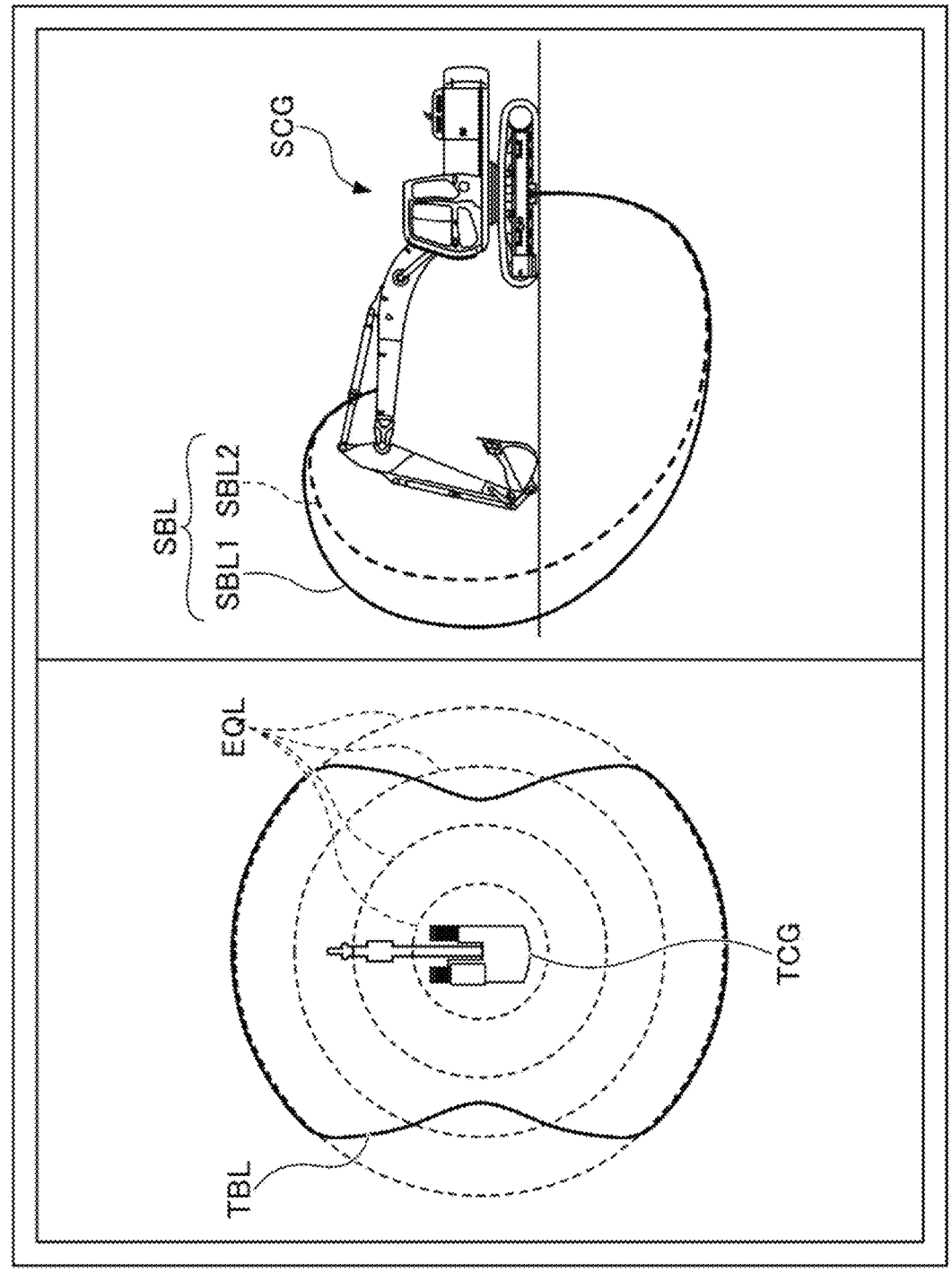

EXCAVATOR AND INFORMATION PROCESSING APPARATUS

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/021051, filed on May 28, 2019 and designating the U.S., which claims priority to Japanese patent application No. 2018-116455, filed on Jun. 19, 2018. The entire contents of the foregoing applications are incorporated herein by reference.

BACKGROUND

Technical Field

The present invention relates to excavators and information processing apparatuses.

Description of Related Art

For example, a technique for controlling the unstable state of a construction machine that leads to tipping or the like is known.

There is a demolition machine equipped with a display device that visually displays the relationship between the working range of the attachment and the stability of the machine body in view of the relative angle (swing angle) between the swing structure and the traveling structure.

SUMMARY

According to an aspect of the present invention, an excavator includes a lower traveling structure, an upper swing structure swingably mounted on the lower traveling structure, an attachment attached to the upper swing structure, a display device, and a hardware processor. The display device is configured to display multiple ranges including a first range and a second range lower in stability degree than the first range in the working range of the attachment such that the multiple ranges are distinguishable. The hardware processor is configured to determine a setting with respect to the multiple ranges.

According to an aspect of the present invention, an information processing apparatus includes a display device and a hardware processor. The display device is configured to display multiple ranges including a first range and a second range lower in stability degree than the first range such that the multiple ranges are distinguishable, with respect to an excavator including a lower traveling structure, an upper swing structure swingably mounted on the lower traveling structure, and an attachment attached to the upper swing structure. The first range and the second range are in the working range of the attachment. The hardware processor is configured to determine a setting with respect to the multiple ranges.

BRIEF DESCRIPTION OF THE DRAWINGS

FIG. 4A is a diagram illustrating an example of a stability range display screen corresponding to a first example of the unstable state controlling function;

FIG. 4C is a diagram illustrating another example of the stability range display screen corresponding to the first example of the unstable state controlling function;

FIG. 5A is a diagram illustrating an example of the stability range display screen corresponding to a second example of the unstable state controlling function;

FIG. 5B is a diagram illustrating another example of the stability range display screen corresponding to the second example of the unstable state controlling function;

FIG. 5C is a diagram illustrating yet another example of the stability range display screen corresponding to the second example of the unstable state controlling function;

FIG. 6C is a diagram illustrating yet another example of the stability range display screen corresponding to the third example of the unstable state controlling function;

FIG. 9 is a diagram illustrating an example of the stability range display screen corresponding to a seventh example of the unstable state controlling function;

DETAILED DESCRIPTION

Unlike demolition machines, general-purpose excavators vary in working pattern and work environment. Therefore, a technique for controlling the unstable state of an excavator capable of dealing with such various working patterns and work environments that leads to tipping or the like is desired.

According to an aspect of the present invention, it is possible to provide an excavator, etc., that can control an unstable state that leads to tipping or the like in accordance with various working patterns, work environments, etc.

An embodiment of the invention is described below with reference to the drawings.

[Shovel Overview]

Figure 1:
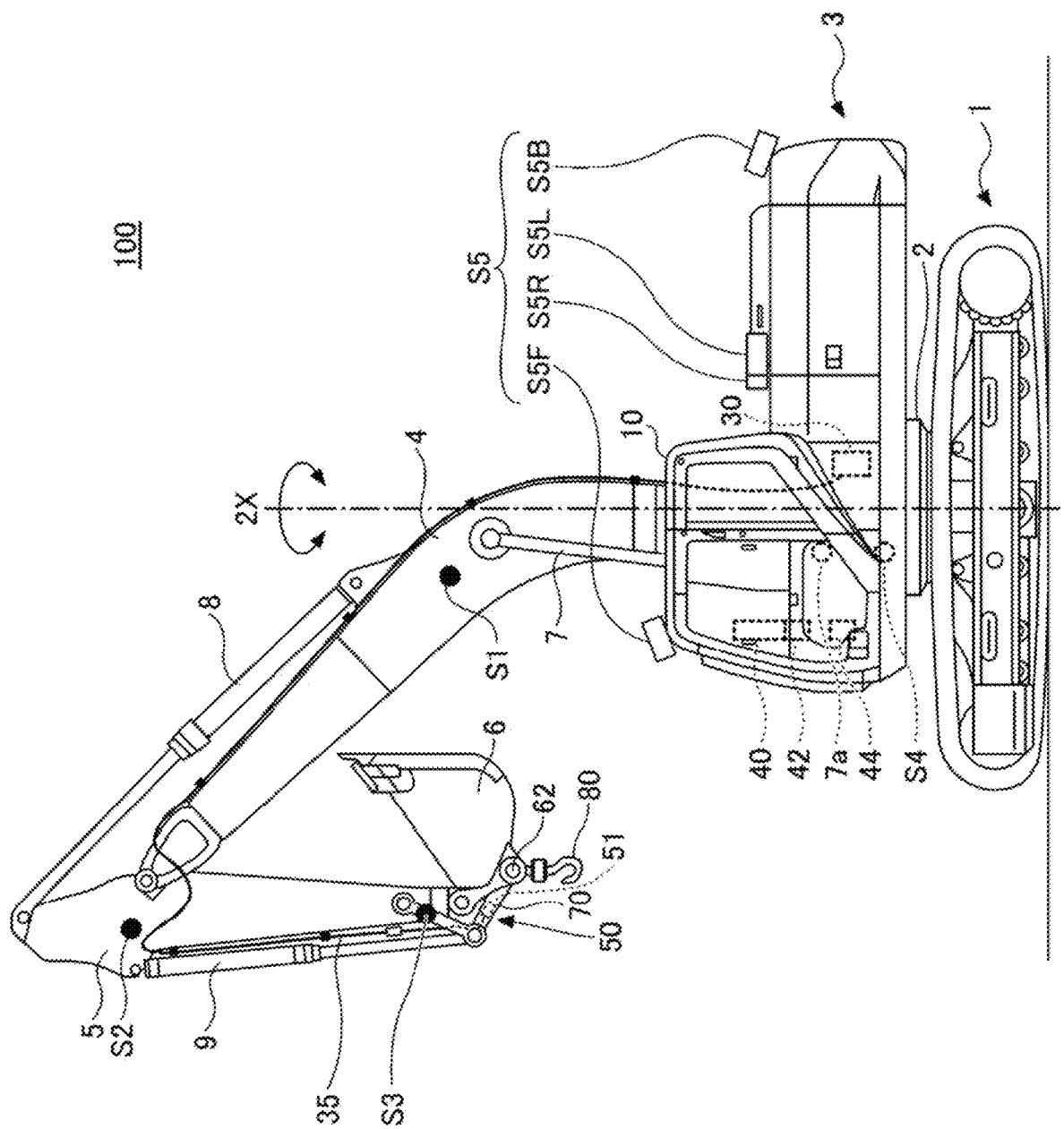
FIG. 1 is a side view of a shovel.

First, an overview of a shovel 100 according to this embodiment is given with reference to FIG. 1.

FIG. 1 is a side view of the shovel 100 according to this embodiment.

The shovel 100 (an example of an excavator) according to this embodiment includes a lower traveling structure 1; an upper swing structure 3 swingably mounted on the lower traveling structure 1 via a swing mechanism 2; a boom 4, an arm 5, and a bucket 6 serving as an attachment (a work implement); and a cabin 10.

The lower traveling structure 1 (an example of a traveling structure) includes a pair of left and right crawlers, which are hydraulically driven by travel hydraulic motors 1L and 1R (see FIG. 2), respectively, to cause the shovel 100 to travel.

The upper swing structure 3 (an example of a swing structure) is driven by a swing hydraulic motor 2A (see FIG. 2) to swing about a swing axis 2X relative to the lower traveling structure 1.

The boom 4 is pivotably attached to the front center of the upper swing structure 3 to be movable upward and downward. The arm 5 is pivotably attached to the distal end of the boom 4 to be pivotable upward and downward. The bucket 6 is pivotably attached to the distal end of the arm 5 to be pivotable upward and downward. The boom 4, the arm 5, and the bucket 6 are hydraulically driven by a boom cylinder 7, an arm cylinder 8, and a bucket cylinder 9, respectively, which serve as hydraulic actuators.

Furthermore, a hook 80 for crane work is attached to the bucket 6 serving as an end attachment. The proximal end of the hook 80 is pivotably connected to a bucket pin 62 that connects the arm 5 and the bucket 6. This allows the hook 80 to be stored in a hook storage part 50 formed between two bucket links 70 when work other than crane work, such as excavation, is performed.

The bucket 6 is an example of an end attachment. Different types of end attachments than the bucket 6 (for example, end attachments different in use from the bucket 6, such as a breaker and a lifting magnet, and end attachments different in specification other than use from the bucket 6, such as a large bucket) may also be attached. That is, the shovel 100 may be configured such that the type of the end attachment can be suitably changed according to work details or the like.

The cabin 10 is a cab in which an operator sits, and is mounted on the front left of the upper swing structure 3.

[Shovel Configuration]

Next, a specific configuration of the shovel 100 is described with reference to FIG. 2 in addition to FIG. 1.

Figure 2:
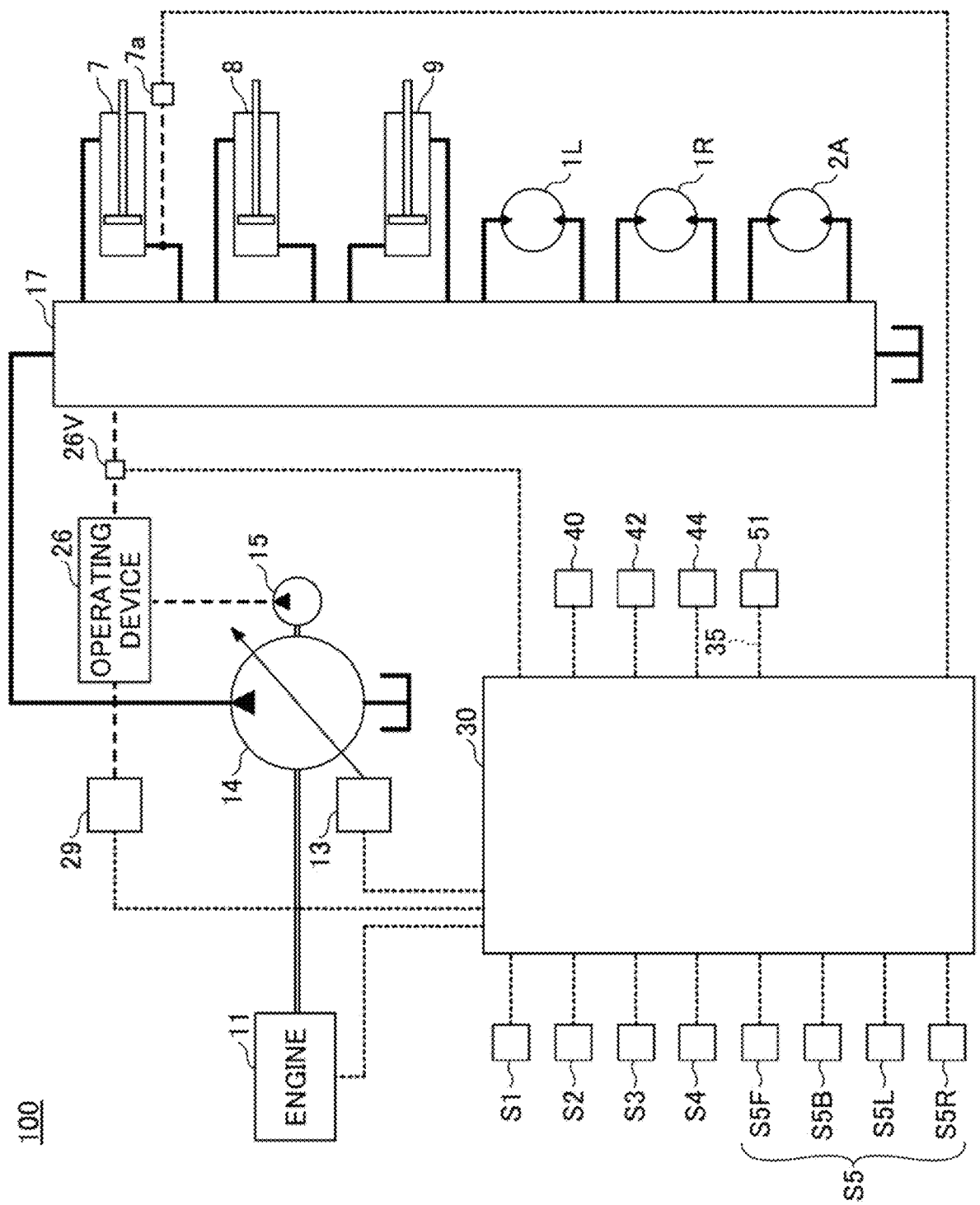
FIG. 2 is a configuration diagram illustrating an example configuration of the shovel.

FIG. 2 is a diagram illustrating a configuration of the shovel 100 according to this embodiment.

In the drawing, a mechanical power line, a high-pressure hydraulic line, a pilot line, and an electric drive and control line are indicated by a double line, a solid line, a dashed line, and a dotted line, respectively. The same is the case with FIG. 3 below.

A hydraulic drive system that hydraulically drives hydraulic actuators in the shovel 100 according to this embodiment includes an engine 11, a regulator 13, a main pump 14, and a control valve 17. Furthermore, the hydraulic drive system of the shovel 100 according to this embodiment includes hydraulic actuators such as the travel hydraulic motors 1L and 1R, the swing hydraulic motor 2A, the boom cylinder 7, the atm cylinder 8, and the bucket cylinder 9 that hydraulically drive the lower traveling structure 1, the upper swing structure 3, the boom 4, the arm 5, and the bucket 6, respectively.

The engine 11 is a main power source in the hydraulic drive system and is mounted on the back of the upper swing structure 3, for example. The engine 11 is, for example, a diesel engine fueled with diesel fuel. Specifically, the engine 11 rotates constantly at a preset target rotational speed under the direct or indirect control of a below-described controller 30 to drive the main pump 14 and a pilot pump 15.

The regulator 13 controls the discharge quantity of the main pump 14 under the control of the controller 30. For example, the regulator 13 adjusts the angle (hereinafter "tilt angle") of the swash plate of the main pump 14 in response to a control command from the controller 30.

The main pump 14 is, for example, mounted on the back of the upper swing structure 3 the same as the engine 11, and supplies hydraulic oil to the control valve 17 through a high-pressure hydraulic line. As described above, the main pump 14 is driven by the engine 11. The main pump 14 is, for example, a variable displacement hydraulic pump, and its discharge flow rate (discharge pressure) is controlled by the regulator 13 adjusting the tilt angle of the swash plate to adjust the stroke length of the piston under the control of the controller 30 as described above.

The control valve 17 is a hydraulic control device that is mounted in the center of the upper swing structure 3 to control the hydraulic drive system according as the operator operates an operating device 26, for example. As described above, the control valve 17 is connected to the main pump 14 through a high-pressure hydraulic line, and selectively supplies hydraulic oil supplied from the main pump 14 to the hydraulic actuators (the travel hydraulic motors 1L and 1R, the swing hydraulic motor 2A, the boom cylinder 7, the arm cylinder 8, and the bucket cylinder 9) in accordance with the operating state of the operating device 26. Specifically, the control valve 17 includes multiple control valves that control the flow rate and flow direction of hydraulic oil supplied from the main pump 14 to the individual hydraulic actuators.

The operation system of various operating elements in the shovel 100 according to the embodiment includes the pilot pump 15 and the operating device 26.

The pilot pump 15 is, for example, mounted on the back of the upper swing structure 3 and supplies a pilot pressure to the operating device 26 via a pilot line. The pilot pump 15 is, for example, a fixed displacement hydraulic pump and is driven by the engine 11 as described above.

The operating device 26 is an operation inputting part provided near the operator seat of the cabin 10 and serves for the operator to operate various operating elements (the lower traveling structure 1, the upper swing structure 3, the boom 4, the arm 5, the bucket 6, etc.). In other words, the operating device 26 is an operation inputting part for the operator operating hydraulic actuators that drive the operating elements (namely, the travel hydraulic motors 1L and 1R, the swing hydraulic motor 2A, the boom cylinder 7, the arm cylinder 8, the bucket cylinder 9, etc.). The operating device 26 is, for example, of a hydraulic pilot type, and is connected to the control valve 17 via a hydraulic line on the secondary side. This allows pilot pressures commensurate with the operating states of the lower traveling structure 1, the upper swing structure 3, the boom 4, the arm 5, the bucket 6, etc., in the operating device 26 to be input to the control valve 17. Therefore, the control valve 17 can selectively drive the hydraulic actuators in accordance with the operating states in the operating device 26. The operating device 26 includes, for example, levers for operating the movement of the attachment, namely, the boom 4 (the boom cylinder 7), the arm 5 (the arm cylinder 8), and the bucket 6 (the bucket cylinder 9), and the swing motion of the upper swing structure 3. Furthermore, the operating device 26 includes, for example, pedals or levers for operating the left and the right of the lower traveling structure 1 (the travel hydraulic motors 1L and 1R).

The operating device 26 may be of an electrical type. In this case, the operating device 26 outputs an electrical signal that represents the details of its operation (for example, the amount of operation and the direction of operation) (hereinafter "operation signal"), and the operation signal is fed into the controller 30, for example. The controller 30 then outputs an operation command signal corresponding to the operation signal to a hydraulic pressure control valve (for example, a below-described hydraulic pressure control valve 31) installed in a pilot line between the pilot pump 15 and the control valve 17. As a result, a pilot pressure commensurate with the details of the operation of the operating device 26 acts on the control valve 17 from the hydraulic pressure control valve. This enables the controller 30 to cause the control valve 17 to operate according to the details of the operation of the operating device 26. Furthermore, when various control valves of the control valve 17 are of an electrically driven type (for example, an electromagnetic solenoid type), the operation signal output from the operating device 26 may be directly input to the various control valves of the control valve 17.

The control system of the shovel 100 according to this embodiment includes the controller 30, a boom bottom pressure sensor 7a, a pressure reducing valve 26V, an operating pressure sensor 29, a display device 40 (display), an input device 42, an audio output device 44, a hook storage status detector 51, a boom angle sensor S1, an arm angle sensor S2, a bucket angle sensor S3, a machine body pose sensor S4, and an image capturing device S5.

The controller 30 is, for example, provided in the cabin 10 to control the driving of the shovel 100. The functions of the controller 30 may be implemented by desired hardware, desired software, or their combination. For example, the controller 30 is constituted mainly of a microcomputer that includes a CPU (Central Processing Unit), a ROM (Read Only Memory), a RAM (Random Access Memory), a non-volatile secondary storage, and various input/output interfaces. The controller 30, for example, implements various functions by executing, on the CPU, various programs stored in the ROM or the non-volatile secondary storage.

The boom bottom pressure sensor 7a is attached to the boom cylinder 7 to detect the pressure of its bottom-side oil chamber (hereinafter "boom bottom pressure"). A detection signal corresponding to the boom bottom pressure detected by the boom bottom pressure sensor 7a is fed into the controller 30.

The pressure reducing valve 26V is provided on the secondary-side pilot line of the operating device 26, and is configured to be able to reduce a pilot pressure corresponding to the operating state (for example, the amount of operation and the direction of operation) of the operating device 26 under the control of the controller 30. For example, the pressure reducing valve 26V is provided for each of individual operating devices such as levers and pedals corresponding to multiple operating elements (namely, multiple hydraulic actuators driving these operating elements) included in the operating device 26. Furthermore, the pressure reducing valve 26V may be provided for some of individual operating devices corresponding to operating elements whose operation is subjectable to restrictions by an unstable state controlling control part 306 as described below. For example, when a control current serving as a control command is not input to the pressure reducing valve 26V from the controller 30, the pressure reducing valve 26V causes a pilot pressure output from the operating device 26 to directly act on the control valve 17 without reducing the pilot pressure. When the control current is input to the pressure reducing valve 26V from the controller 30, the pressure reducing valve 26V reduces the pilot pressure output from the operating device 26 according to the magnitude of the control current and causes the reduced pilot pressure to act on the control valve 17. This enables the controller 30 to restrict the operation of a hydraulic actuator corresponding to the details of operation performed on the operating device 26 by the operator or the like, namely, the movement of an operating element driven by the hydraulic actuator.

As described above, the operating pressure sensor 29 detects a pilot pressure corresponding to a pilot pressure on the secondary side of the operating device 26, namely, a pilot pressure corresponding to the operating state of each operating element (hydraulic actuator) in the operating device 26. The detection signals of pilot pressures commensurate with the details of operation (operating states) of the lower traveling structure 1, the upper swing structure 3, the boom 4, the arm 5, the bucket 6, etc., in the operating device 26 generated by the operating pressure sensor 29 are fed into the controller 30.

The display device 40 is provided at such a location as to be easily viewable by the operator seated in the cabin 10, and displays various information images under the control of the controller 30. The display device 40 may be either connected to the controller 30 via an in-vehicle communications network such as a CAN (Controller Area Network) or connected to the controller 30 via a one-to-one dedicated line.

The input device 42 is provided within the reach of the operator seated in the cabin 10 to receive various operation inputs made by the operator and output signals corresponding to the operation inputs to the controller 30. The input device 42 may include, for example, a touchscreen provided on the display of a display device that displays various information images, a knob switch provided at the end of a lever portion of a lever included in the operating device 26, and a button switch, a lever, a toggle, a dial, etc., provided around the display device 40. More specifically, the input device 42 includes a crane mode switch 42a, a mode adjustment dial 42b, a load item setting operation part 42c, and a stability range setting operation part 42d. A signal corresponding to the details of operation on the input device 42 is fed into the controller 30.

The crane mode switch 42a receives an operation input for the operator or the like switching the operating mode of the shovel 100 between a normal mode for performing excavation work, etc., and a crane mode for performing crane work using the hook 80. The normal mode is the operating mode of the shovel 100 in which the movement speed of the attachment (for example, the boom 4) responding to the operator's operation through the operating device 26 is relatively fast. The crane mode is the operating mode of the shovel 100 in which the movement speed of the attachment responding to the operator's operation through the operating device 26 is relatively slow. According to this, during crane work, because the movement of the boom 4 responding to the operator's operation is relatively slow, for example, the shovel 100 can stably hoist and move a suspension load. When the crane mode switch 42a is turned on, the controller 30 switches the operating mode of the shovel 100 from the normal mode to the crane mode. When the crane mode switch 42a is turned off, the controller 30 switches the operating mode of the shovel 100 from the crane mode to the normal mode.

In the crane mode, the controller 30 sets the target rotational speed of the engine 11 that is lower than in the case of the normal mode. This enables the controller 30 to make the movement of the attachment slower in the crane mode than in the normal mode.

The mode adjustment dial 42*b* receives an operation input for the operator or the like selecting one operating mode among the multiple operating modes of the shovel 100 that are different in the target rotational speed of the engine 11. Each of the selectable operating modes is an operating mode that is applied when the shovel 100 is in the normal mode. Examples of the operating modes include SP (Super Power) mode whose target rotational speed of the engine 11 is relatively high and which prioritizes work speed, H (Heavy) mode whose target rotational speed of the engine 11 is intermediate and which is optimum for heavy work with a relatively high workload, and A (Auto) mode whose target rotational speed of the engine 11 is relatively low and which supports a wide range of work. The load item setting operation part 42*c* receives an operation input for the operator or the like setting items of settings regarding a load that acts on the distal end of the attachment (hereinafter "load items"). The load items may include, for example, the type of the end attachment. Furthermore, the load items may include, for example, the quality of earth (hereinafter "earth quality" such as the type of earth and the density of earth) at a work site of the shovel 100. That is, the load items include at least one of multiple items including the above-described items. For example, the load item setting operation part 42*c* receives various operations on a predetermined operation screen for setting the load items, for example, displayed on the display device 40.

The load items may also be automatically determined. For example, the controller 30 may automatically determine the type of the end attachment, the earth quality of a work site, etc., based on an image captured by a camera S5F.

The stability range setting operation part 42*d* receives an operation input for the operator or the like setting (changing) the range of stability of the shovel 100 described below. For example, the stability range setting operation part 42*d* receives various operations on a predetermined operation screen for changing the range of stability.

The audio output device 44 is provided in the cabin 10 and outputs various kinds of audio under the control of the controller 30. Examples of the audio output device 44 include a loudspeaker and a buzzer.

The hook storage status detector 51 detects the status of storage of the hook 80 into the attachment (the hook storage part 50). The hook storage status detector 51 is, for example, a switch that is closed when the hook 80 is in the hook storage part 50 and is open when the hook 80 is not in the hook storage part 50. The hook storage status detector 51 is connected to the controller 30 through a cable 35, so that the controller 30 can determine whether the hook 80 is stored in the hook storage part 50 based on whether the hook storage status detector 51 is conducting or non-conducting.

The controller 30 may automatically switch the operating mode of the shovel 100 between the crane mode and the normal mode based on information on detection by the hook storage status detector 51. In this case, the crane mode switch 42*a* may be omitted. For example, in response to determining that the hook 80 is extracted from the hook storage part 50 based on the switching of the hook storage status detector 51 from the conducting state to the interrupting state, the controller 30 may switch the operating mode of the shovel 100 from the normal mode to the crane mode. Furthermore, in response to determining that the hook 80 is returned to the hook storage part 50 based on the switching of the hook storage status detector 51 from the interrupting state to the conducting state, the controller 30 may switch the operating mode of the shovel 100 from the crane mode to the normal mode.

The boom angle sensor S1 is attached to the boom 4 to detect the pose angle, specifically, the elevation angle, of the boom 4 relative to the upper swing structure 3 (hereinafter, "boom angle"). The boom angle sensor S1, for example, detects the angle of a straight line connecting the pivot points of the boom 4 at its both ends to the swing plane of the upper swing structure 3 in a side view. Examples of the boom angle sensor S1 may include a rotary encoder, an acceleration sensor, an angular velocity sensor, a six-axis sensor, an IMU (Inertial Measurement Unit), which is also the case with the arm angle sensor S2, the bucket angle sensor S3, and the machine body pose sensor S4. A detection signal corresponding to the boom angle generated by the boom angle sensor S1 is fed into the controller 30.

The pose state (pose angle) of the boom 4 may be identified (detected) from an image captured by the camera S5F, which is also the case with the pose states (pose angles) of the arm 5 and the bucket 6.

The arm angle sensor S2 is attached to the arm 5 to detect the pose angle, specifically, the pivot angle, of the arm 5 relative to the boom 4 (hereinafter "arm angle"), for example, the angle of a straight line connecting the pivot points of the arm 5 at its both ends to the straight line connecting the pivot points of the boom 4 at its both ends in a side view. A detection signal corresponding to the arm angle generated by the arm angle sensor S2 is fed into the controller 30.

The bucket angle sensor S3 is attached to the bucket 6 to detect the pose angle, specifically, the pivot angle, of the bucket 6 relative to the arm 5 (hereinafter "bucket angle"), for example, the angle of a straight line connecting the pivot point and the distal end (blade edge) of the bucket 6 to the straight line connecting the pivot points of the arm 5 at its both ends in a side view. A detection signal corresponding to the bucket angle generated by the bucket angle sensor S3 is fed into the controller 30.

The machine body pose sensor S4 detects the pose state of the machine body, specifically, the upper swing structure 3. The machine body pose sensor S4 is, for example, attached to the upper swing structure 3 to detect the pose angles of the upper swing structure 3 about two axes in its longitudinal direction and lateral direction, namely, the tilt angles (hereinafter "longitudinal tilt angle" and "lateral tilt angle") of the upper swing structure 3. Furthermore, the machine body pose sensor S4 detects the pose angle of the upper swing structure 3 about an axis in its vertical direction, namely, the swing angle of the upper swing structure 3 about the swing axis 2X. Detection signals corresponding to the tilt angles (longitudinal tilt angle and lateral tilt angle) and the swing angle generated by the machine body pose sensor S4 are fed into the controller 30.

The pose state of the machine body may also be identified (detected) from an image captured by the image capturing device S5. For example, the controller 30 may identify (detect) the pose state of the machine body based on the pose state of a reference object (for example, a building, a support post or the like at a work site) in an image captured by the image capturing device S5.

The image capturing device S5 is attached on top of the upper swing structure 3 to capture an image of an area surrounding the shovel 100 and output the captured image. The image capturing device S5 includes the camera S5F and cameras S5B, S5L, and S5R.

The cameras S5F, S5B, S5L, and S5R are attached to the top of the front end (for example, the top of the front end of the cabin 10), the top of the back end, the top of the left end, and the top of the right end, respectively, of the upper swing structure 3 to capture an image of an area in front, behind, to the left, and to the right, respectively, of the upper swing structure 3. For example, each of the cameras S5F, S5B, S5L, and S5R is a monocular wide angle camera having a very wide angle of view. Specifically, the cameras S5F, S5B, S5L, and S5R are attached on top of the upper swing structure 3 in such a manner that their respective optical axes point obliquely downward, and capture an image within a vertical imaging range from the ground near the shovel 100 to an area far from the shovel 100. While the shovel is in operation, the cameras S5F, S5B, S5L, and S5R output captured images at predetermined intervals (for example, every 1/30 seconds), and the output captured images are fed into the controller 30.

[Overview of Unstable State Controlling Function of Shovel]

Next, an overview of the shovel 100's function of controlling an unstable state (hereinafter, unstable state controlling function) is given with reference to FIG. 3.

Figure 3:
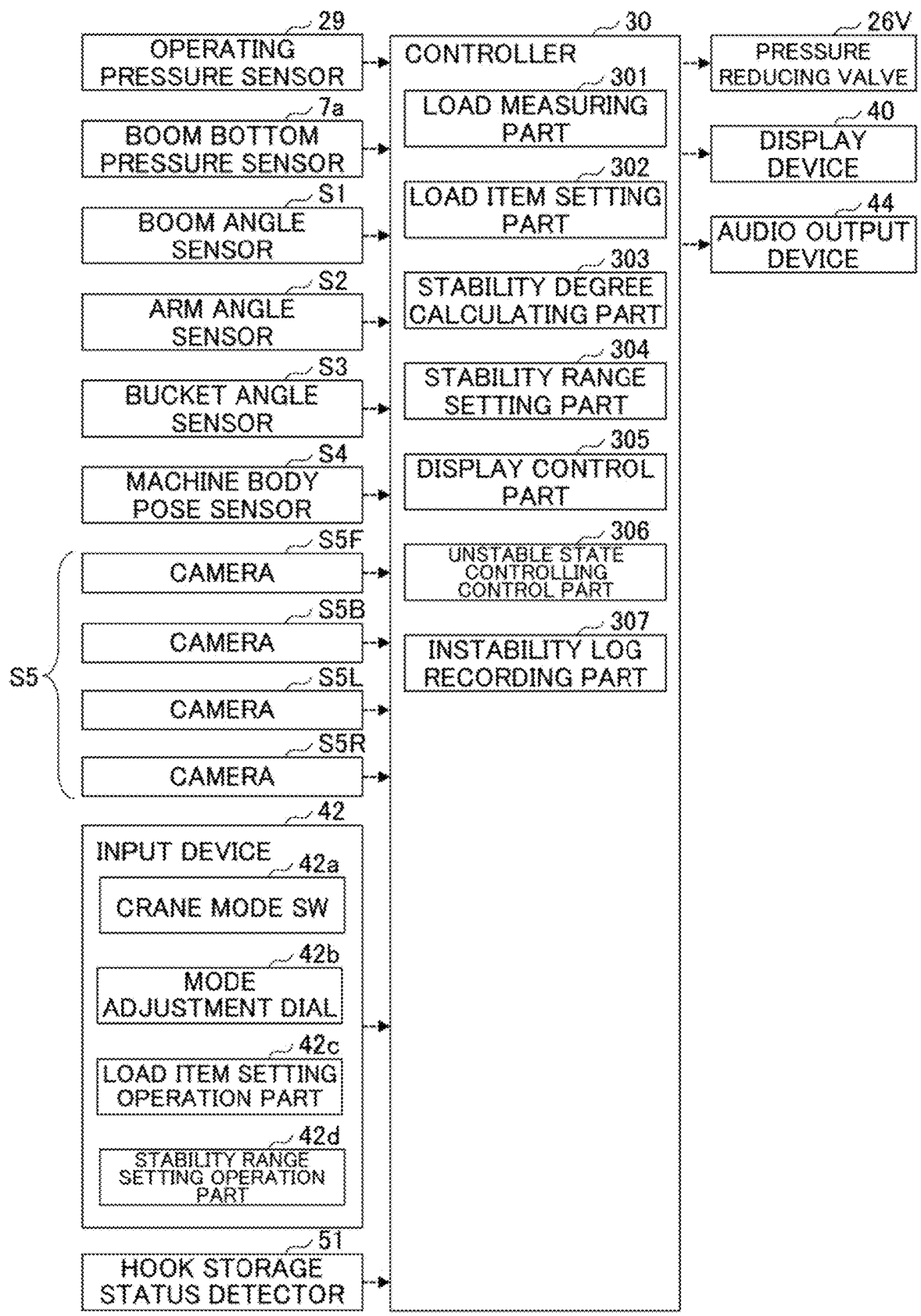
FIG. 3 is a functional block diagram illustrating an example functional configuration associated with an unstable state controlling function of the shovel.

FIG. 3 is a functional block diagram illustrating a functional configuration of the unstable state controlling function of the shovel 100 according to this embodiment.

The controller 30, for example, includes a load measuring part 301, a load item setting part 302, a stability degree calculating part 303, a stability range setting part 304, a display control part 305, an unstable state controlling control part 306, and an instability log recording part 307 as functional parts implemented by executing one or more programs stored in the ROM or the secondary storage on the CPU.

The load measuring part 301 measures a load that acts on the distal end of the attachment. The load measuring part 301 automatically measures a load that acts on the distal end of the attachment as an operation prerequisite to the below-described calculation of the degree of stability performed by the stability degree calculating part 303. Furthermore, the load measuring part 301 may also measure a load that acts on the distal end of the attachment in response to a predetermined operation on the input device 42 performed by the operator or the like (hereinafter "load measuring operation"). In this case, the controller 30 may display, on the display device 40, a load (for example, a carried load as described below) measured by the load measuring part 301 in response to a load measuring operation performed by the operator or the like. A load to be measured is, for example, the load of a load object carried on the end attachment (for example, earth or the like contained in the bucket 6, a suspension load suspended from the hook 80, or the like) (hereinafter "carried load"). Furthermore, a load to be measured may also be, for example, the sum of a carried load and a difference (increase or decrease) in weight from a standard end attachment (for example, the bucket 6) due to a difference in the type of the end attachment.

Specifically, the load measuring part 301 measures a load at the distal end of the attachment based on the detection information of the boom bottom pressure sensor 7a, the boom angle sensor S1, the arm angle sensor S2, and the bucket angle sensor S3. This is because the boom bottom pressure tends to increase as the load at the distal end of the attachment increases. Furthermore, this is because the boom bottom pressure changes according to the pose of the attachment (the position of the bucket 6 relative to the upper swing structure 3) defined by the boom angle, the arm angle, and the bucket angle. More specifically, the load measuring part 301, for example, may measure (calculate) a load at the distal end of the attachment using a map, an operation expression, or the like that predefines the relationship between the boom bottom pressure and the pose of the attachment and a load at the distal end of the attachment. Furthermore, in the case of measuring the carried load of the end attachment, the load measuring part 301 may correct the effect of the type of the end attachment based on the type of the end attachment set by the load item setting part 302 described below. More specifically, the load measuring part 301 may measure (calculate) a load at the distal end of the attachment by correcting the load calculated based on the boom bottom pressure and the pose of the end attachment, based on the difference in weight between an end attachment of the set type and a standard type of end attachment. Furthermore, the load measuring part 301 may measure the carried load of the end attachment based on the above-described map or operation expression prepared for each type of end attachment.

The load item setting part 302 sets load items according to an operation performed on the load item setting operation part 42c by the operator or the like. For example, the load item setting part 302 sets one or more or all items included in the load items according to an operation on the load item setting operation part 42c. Information on the details of settings is stored in a memory area predefined in the secondary storage or the like.

The stability degree calculating part 303 performs calculation regarding the relationship between the position of the distal end of the attachment and the degree of stability of the shovel 100 (hereinafter, simply "stability degree") when the distal end of the attachment is at the position (hereinafter "stability degree calculation") with respect to the range of some or all positions that the distal end of the attachment can structurally occupy, namely, part or the entirety of the working range of the attachment with reference to the machine body including the lower traveling structure 1 and the upper swing structure 3 (hereinafter "calculation target range"). For example, the stability degree calculating part 303 may calculate, with respect to each of discrete positions within the calculation target range, the stability degree when the distal end of the attachment is at the position. Furthermore, for example, the stability degree calculating part 303 may calculate, with respect to one or more reference values within the calculation target range, the positions of the distal end of the attachment where the stability degree satisfies the reference values and derive equivalent positions regarding the stability degree (for example, the boundary of a stability range as described below).

The stability degree indicates how unlikely the unstable state of the shovel 100 is to occur. Examples of the unstable state of the shovel 100 may include a state where the lower traveling structure 1 slips (is dragged) forward or backward on the ground in response to an external force acting on the attachment from the ground during excavation work, leveling work or the like (hereinafter "slipping state"). Furthermore, examples of the unstable state of the shovel 100 may include the lifting motion of the front or back of the lower traveling structure 1 that may lead to the tipping of the shovel 100 depending on its degree (hereinafter "lifted state"). In addition, examples of the unstable state of the shovel 100 may include the vibration of the machine body that may be caused by the movement of the attachment, such as the vibration of the upper swing structure 3 that may be caused by a change in the moment of inertia of the attachment during dumping work in the air acting on the upper swing structure 3 as a reaction force (hereinafter "machine body vibrating state"). That is, the unstable state of the shovel 100 includes at least one of the slipping state, the lifted state, and the machine body vibrating state. Furthermore, the stability degree may also be, for example, a numerical value that may continuously change according to a certain standard or pre-sectioned numerical values (step values) representing multiple levels that indicate the unlikelihood of the tipping of the shovel 100. Furthermore, the stability degree may be the degree of static stability of the shovel 100 or the degree of dynamic stability of the shovel 100. Furthermore, the stability degree may be the degree of stability that takes both the degree of static stability and the degree of dynamic stability of the shovel 100 into consideration (for example, representing the degree of dynamic stability when the attachment of the shovel 100 is in operation and representing the degree of static stability when the shovel 100 is stationary).

The distal end of the attachment as a prerequisite for the stability degree calculation is a predetermined representative position on the end attachment, specifically, a portion of the end attachment on which a work load acts, for example, the blade edge of the bucket 6, a hook-shaped portion of the hook 80, or the like. The distal end of the attachment as a prerequisite for the stability degree calculation may be set (changed) based on, for example, the details of work performed by the shovel 100 (whether the work is crane work or other than crane work). Specifically, the distal end of the attachment as a prerequisite for the stability degree calculation may be set at, for example, the lower end of the hook-shaped portion of the hook 80 when the shovel 100 performs crane work, and may be set at, for example, the teeth tips of the bucket 6 in the case of crane work. Furthermore, the distal end of the attachment as a prerequisite for the stability degree calculation may be set (changed) according to the type of the end attachment. This is because a relative position on which a work load acts changes with reference to the machine body (the upper swing structure 3) according to the type of the end attachment. Specifically, the distal end of the attachment as a prerequisite for the stability degree calculation may be set (changed) according to the type of the bucket 6 (for example, whether the bucket 6 is a bucket of standard size or a bucket of large size, or the like). In this case, the type of the end attachment may be, for example, automatically identified by the controller 30 based on an image captured by the camera S5F or the like or may be determined according to a setting input through the input device 42 by the operator or the like. Furthermore, the distal end of the attachment as a prerequisite for the stability degree calculation may be set (changed) according to the type of a part from which a suspension load is suspended (for example, whether the part is the hook 80 pertaining to the bucket 6 or a hook pertaining to a non-depicted quick hitch attached to the distal end of the arm 5, or the like) when the shovel 100 performs crane work. In this case, the type of a part from which a suspension load is suspended may be, for example, automatically identified by the controller 30 based on an image captured by the camera S5F or the like or may be determined according to a setting input through the input device 42 by the operator or the like, the same as in the case of the above-described type of the end attachment. This makes it possible for the controller 30 to improve the accuracy of the stability degree calculation compared with the case where the setting of the distal end of the attachment as a prerequisite for the stability degree calculation is fixed. In other words, the controller 30 can display a more accurate stability range on a below-described stability range display screen displayed on the display device 40.

The positions that the distal end of the attachment can structurally occupy indicate positions relative to the machine body that the distal end of the attachment can reach along the structural range of movement because of the movement of the attachment and the swing motion of the upper swing structure 3 based on the assumption that there is no restriction due to some kind of control. That is, the positions that the distal end of the attachment can structurally occupy are the range of positions circumferentially extending 360° around the shovel 100 based on the swing motion of the upper swing structure 3 and the range of positions that are structurally reachable in the longitudinal direction and the vertical direction of the upper swing structure 3 based on the movement of the attachment. The positions that the distal end of the attachment can structurally occupy are predefined by the structural movement angle of the boom 4 relative to the upper swing structure 3 (for example, the range of movement based on the range of extension and retraction of the boom cylinder 7), the structural movement angle of the arm 5 relative to the boom 4 (for example, the range of movement based on the range of extension and retraction of the arm cylinder 8), and the range of movement of the end attachment (for example, the bucket 6) relative to the arm 5. The positions that the distal end of the attachment can structurally occupy may include positions vertically lower than the ground on which the shovel 100 (the lower traveling structure 1) is positioned.

The stability degree calculating part 303 may perform the stability degree calculation in view of the pose of the attachment (the boom angle, the arm angle, and the bucket angle) corresponding to the position of the distal end of the attachment. This is because the moment of inertia of the attachment varies according to the position of the distal end of the attachment relative to the upper swing structure 3 to affect the likelihood of the occurrence of the unstable state of the shovel 100 such as the lifted state, the machine body vibrating state, or the like, for example. Furthermore, this is because the magnitude of a tipping moment that acts on the upper swing structure 3 through the attachment (a moment in a direction to tip the shovel 100 to the front or back of the upper swing structure 3) varies according to the pose of the attachment.

Furthermore, the stability degree calculating part 303 may perform the stability degree calculation in view of a current load at the distal end of the attachment. This is because as a load acting on the distal end of the attachment increases, a tipping moment to tip the shovel 100 to the front of the upper swing structure 3 increases to increase the likelihood of the tipping of the shovel 100. For example, the stability degree calculating part 303 performs the stability degree calculation in view of a load at the distal end of the attachment measured by the load measuring part 301. Furthermore, for example, the stability degree calculating part 303 performs the stability degree calculation in view of a load at the distal end of the attachment estimated from the setting details of the load items (for example, the type of the attachment and the earth equality of a work site) set by the load item setting part 302. Furthermore, for example, when a carried load is measured by the load measuring part 301, the stability degree calculating part 303 performs the stability degree calculation in view of the carried load measured by the load measuring part 301 and the type of the attachment among the load items set by the load item setting part 302.

Furthermore, the stability degree calculating part 303 may perform the stability degree calculation in view of information on the orientation of the upper swing structure 3 (the orientation of a part where the attachment is attached) relative to the travel direction (forward travel direction or backward travel direction) of the lower traveling structure 1 (for example, the swing angle of the upper swing structure 3). This is because, for example, when the upper swing structure 3 is oriented in a direction substantially perpendicular to the travel direction of the lower traveling structure 1 (namely, the width direction of the lower traveling structure 1), the length of ground contact of the lower traveling structure 1 in the longitudinal direction of the upper swing structure 3 is shorter to cause the tipping fulcrum to be closer to the machine body so that tipping is more likely to occur than in the case where the upper swing structure 3 is oriented in the same direction as the travel direction of the lower traveling structure 1.

Furthermore, the stability degree calculating part 303 may also perform the stability degree calculation in view of the tilt state of the machine body (for example, the tilt state of the upper swing structure 3 detected by the machine body pose sensor S4). This is because when the machine body (the lower traveling structure 1 and the upper swing structure 3) is tilted, the lower traveling structure 1 is likely to slip or the shovel 100 is likely to tip over in the tilt direction.

Furthermore, the stability degree calculating part 303 may also perform the stability degree calculation in view of information on the movement speed of the attachment (hereinafter "movement speed-related information"). This is because when the movement speed of the attachment relatively increases, the effect over the variation of the moment of inertia of the attachment or the like increases. The movement speed-related information may include, for example, detection information on the movement of the attachment (for example, detection values of the movement speed of the boom cylinder 7, the arm cylinder 8, the bucket cylinder 9, etc., detected by cylinder sensors). Furthermore, the movement speed-related information may include information on the operating state of the engine 11 (hereinafter "engine operating state information"). This is because as the rotational speed (output) of the engine 11 increases, the movement speed of the attachment relatively increases. The engine operating state information may include, for example, a detection value of the rotational speed of the engine 11, the target rotational speed of the engine 11, and the operating mode of the shovel 100 set by an operation on the crane mode switch 42a or the mode adjustment dial 42b. Furthermore, the movement speed-related information may include information on the operating state of the main pump 14 (hereinafter "pump operating state information"). This is because as the output of the main pump 14 increases, the movement speed of the attachment relatively increases. The pump operating state information may include, for example, a detection value of the discharge pressure of the main pump 14 and a control command value of the controller 30 to the regulator 13.

The main pump 14 may be driven by an electric motor instead of the engine 11. In this case, the movement speed-related information may include information on the operating state of the electric motor. The information on the operating state of the electric motor includes, for example, a detection value of the rotational speed of the electric motor and a control command value to the electric motor.

Furthermore, the stability degree calculating part 303 may also perform the stability degree calculation in view of information on the tendency of the operator's operation of the shovel 100 (hereinafter "operation tendency information") in addition to the pose of the attachment corresponding to the position of the distal end of the attachment. This is because, of the case where the operating device 26 is operated relatively slow (carefully) and the case where the operating device 26 is operated relatively fast (rough), the latter is believed to be an operation that is more likely to tip the shovel 100. The operation tendency information may include information on the history of the operation details (operating state) of the operating device 26 detected by the operating pressure sensor 29. Furthermore, the operation tendency information may include the operator's identification information (for example, an operator ID (Identifier)) set through the input device 42 by the operator or identified using an image captured by an indoor camera or the like that is not depicted. This is because the operator's identification information can be associated with the operator's operation tendency corresponding to the operator's identification information. Furthermore, the operation tendency information includes the operator's attribute information (for example, age, years of experience, gender, etc.) that is recorded in advance or set through the input device 42 by the operator. This is because there may be a macro correlation between the operator's operation tendency and the operator's attributes. Furthermore, the operation tendency information may include input information on the self-reported operation tendency of the operator set through the input device 42 by the operator (for example, the value of a level selected and set by the operator from among multiple levels concerning the degree of operation carefulness).

That is, the stability degree calculating part 303 may perform the stability degree calculation in view of at least one of multiple items that affect the degree of stability of the shovel 100 including the above-described items.

The stability range setting part 304 sets a stability range where the stability degree is relatively high and which corresponds to the stable state of the shovel 100 within the above-described calculation target range (namely, part or the entirety of the working range of the attachment with reference to the machine body) based on a predetermined standard, using the calculation result of the stability degree calculating part 303. Specifically, the stability range setting part 304 sets a range where the stability degree is higher than a predetermined standard, in which the unstable state of the shovel 100 is determined to be less likely to occur, within the calculation target range.

Furthermore, the stability range setting part 304 sets (changes) the boundary of the stability range within a range corresponding to the above-described reference level, namely, the stability range set based on the reference level (hereinafter "reference stability range"), in response to an operation on the stability range setting operation part 42d performed by the operator or the like. For example, the stability range setting part 304 may change the setting of the boundary of the stability range in a direction to increase or decrease the stability degree within a range where the stability degree is higher than at the boundary of the reference stability range in response to an operation on the stability range setting operation part 42d. Furthermore, the stability range setting part 304 may make such a setting change as to return the boundary of a stability range where the stability degree is higher than at the boundary of the reference stability range to the boundary of the reference stability range in response to an operation on the stability range setting operation part 42d. This enables the operator or the like to personally set a stability range more conservative than the reference stability range and put the below-described unstable state controlling function (specifically, a stability range displaying function and an unstable state controlling control function) into operation based on the more conservative stability range. Furthermore, at this point, the stability range setting part 304 may change the setting of only part of the boundary of the stability range in response to an operation on the stability range setting operation part 42d. For example, the stability range setting part 304 may change, within the reference stability range, the setting of only one or some boundary sections among the boundary sections of the stability range separated in advance and corresponding to the front side, back side, right side, left side, upper side, and lower side of the shovel 100, according to the operator's manual specification or automatically based on a predetermined condition. This enables the operator or the like to set the stability range with more degree of freedom.

The display control part 305 displays the relationship between the position of the distal end of the attachment within the calculation target range and the degree of stability of the shovel 100, namely, the relationship between the working range of the attachment with reference to the machine body and the degree of stability of the shovel 100, on the display device 40 based on the calculation result of the stability degree calculating part 303. For example, the display control part 305 displays the stability range set by the stability range setting part 304 on the display device 40. Hereinafter, this function implemented by the display control part 305 is referred to as "stability range displaying function." The details of the stability range displaying function are described below (see FIGS. 4A through 8B).

The unstable state controlling control part 306 performs the unstable state controlling control on the shovel 100 based on the calculation result of the stability degree calculating part 303. Hereinafter, this function implemented by the unstable state controlling control part 306 is referred to as "unstable state controlling control function."

For example, when the position (current position) of the distal end of the attachment departs from the stability range set by the stability range setting part 304, the unstable state controlling control part 306 outputs an alarm (hereinafter "stability range departure alarm") to the operator or the like through the display device 40 or the audio output device 44. The position of the distal end of the attachment is calculated based on the detection information of the boom angle, the arm angle, and the bucket angle detected by the boom angle sensor S1, the arm angle sensor S2, and the bucket angle sensor S3. Specifically, the unstable state controlling control part 306 may output the stability range departure alarm in a manner such as by displaying text information indicating that the shovel 100 is more likely to tip over on the display device or changing the manner of display of the display area (screen) (for example, blink the screen or change a color on the screen) of the display device 40. Furthermore, the unstable state controlling control part 306 may output the stability range departure alarm in a manner such as by outputting audio or a warning sound indicating that the shovel 100 is more likely to tip over through the audio output device 44. This enables the unstable state controlling control part 306 to encourage the operator or the like to perform such operation as to stabilize the shovel 100 to control the tipping of the shovel 100.

The unstable state controlling control part 306 may also notify the operator or the like of information on the degree of stability of the shovel 100 regardless of the presence or absence of departure from the stability range. For example, when the current position of the distal end of the attachment is at a position relatively close to an instability range within the stability range, for example, where a distance to the boundary between the stability range and the instability range is less than or equal to a predetermined threshold, the unstable state controlling control part 306 may report a relative decrease in the degree of stability of the shovel 100 through the display device 40 or the audio output device 44. That is, the unstable state controlling control part 306 may impart information on the current degree of stability of the shovel 100 in a stepwise manner according to the magnitude of the degree of stability of the shovel 100. Specifically, the unstable state controlling control part 306 may display a below-described shovel image on the stability range display screen of the display device 40 in yellow when the degree of stability of the shovel 100 is relatively reduced within the stability range and display the shovel image in red when the degree of stability of the shovel 100 is out of the stability range. Furthermore, the unstable state controlling control part 306 may output a beep at relatively long intervals through the audio output device 44 when the degree of stability of the shovel 100 is relatively reduced within the stability range and output a beep at relatively short intervals or output a continuous beep when the degree of stability of the shovel 100 is out of the stability range.

Furthermore, for example, the unstable state controlling control part 306 restricts the movement of the shovel 100 (the lower traveling structure 1, the upper swing structure 3, the attachment, etc.) made by the operator through the operating device 26 when the position (current position) of the distal end of the attachment departs from the stability range set by the stability range setting part 304. That is, in the instability range, the movement speed of the attachment may be set to be lower than in the stability range. Specifically, the unstable state controlling control part 306 outputs a control current to the pressure reducing valve 26V to stop the movement of the shovel 100. At this point, operating elements whose movement is restricted include at least the attachment (the boom 4, the arm 5, and the bucket 6. This enables the unstable state controlling control part 306 to restrict the movement of the shovel 100 to prevent the tipping of the shovel 100 when the shovel 100 is more likely to tip over. Furthermore, when the position of the distal end of the attachment departs from the stability range set by the stability range setting part 304, the unstable state controlling control part 306 may gradually change the degree of restricting the movement of the shovel 100 according to the degree of departure. This enables the unstable state controlling control part 306 to control a decrease in the work efficiency of the shovel 100 by reducing the degree of restriction on the movement of the shovel 100 when the degree of departure from the stability range is low, while preventing the tipping of the shovel 100. Specifically, the unstable state controlling control part 306 may slowly restrict the movement of the shovel 100 caused by the operator's operation through the operating device 26 when the degree of departure is relatively low and stop the movement of the shovel 100 when the degree of departure is relatively high.

The unstable state controlling control part 306 may perform only one or both of outputting the stability range departure alarm and restricting the movement of the shovel 100.

The instability log recording part 307 records log information in a predetermined storage area of the secondary storage when the position (current position) of the distal end of the attachment departs from the stability range set by the stability range setting part 304. Furthermore, the instability log recording part 307 may record log information when the position (current position) of the distal end of the attachment continuously stays out of the stability range set by the stability range setting part 304 for a predetermined time or more. Hereinafter, this function implemented by the instability log recording part 307 is referred to as "instability log recording function." Examples of the log information may include information on the date and time at which the position of the distal end of the attachment departs from the stability range, the identification information of the operator, information on the level of moving out (the amount of moving out) of the stability range, information on the duration of staying out of the stability range, information on the operating state of the operating device 26, information on work details, and information on the ambient environment of the shovel 100 (for example, an image captured by the image capturing device S5). This, for example, enables a manager, a supervisor or the like at a work site to take security measures with respect to controlling the unstable state of the shovel 100 at the work site, such as identifying an operator who has performed such an operation as to cause the pose of the shovel 100 to be unstable and analyzing a situation where such an operation is likely to be performed from the situation at the time.

The controller 30 may omit outputting the stability range departure alarm or restricting the movement of the shovel 100 and only record the log information when the distal end of the attachment departs from the stability range. Furthermore, the controller 30 may also omit recording the log information and may perform only at least one of outputting the stability range departure alarm and restricting the movement of the shovel 100 when the distal end of the attachment departs from the stability range. That is, when the distal end of the attachment departs from the stability range, the controller 30 may perform at least one of outputting the stability range departure alarm, restricting the movement of the shovel 100, and recording the log information.

[Details of Unstable State Controlling Function of Shovel]

Next, the unstable state controlling function of the shovel 100 is described in detail with reference to FIGS. 4A through 8B.

First Example of Unstable State Controlling Function

Figure 4B:
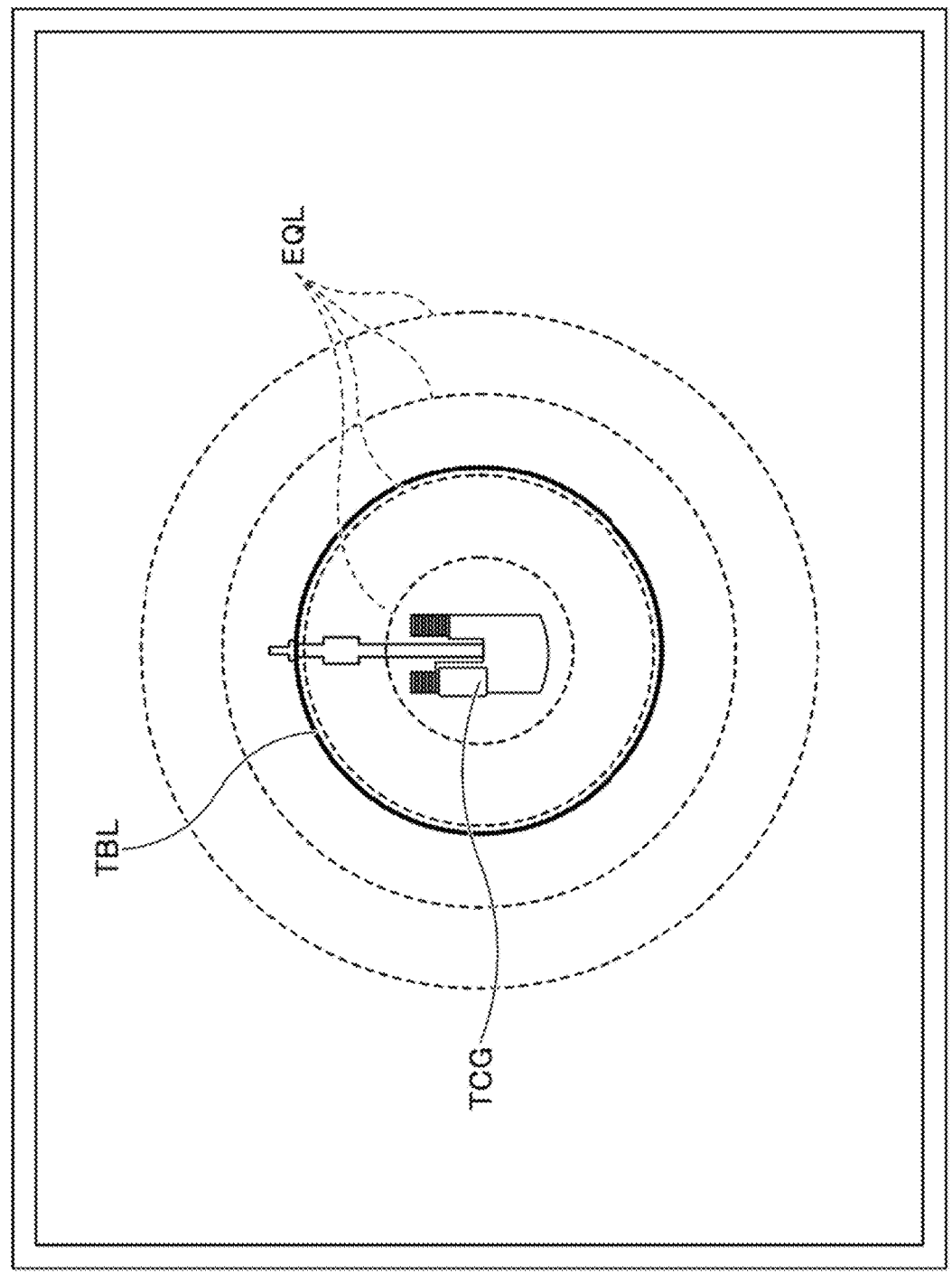
FIG. 4B is a diagram illustrating the example of the stability range display screen corresponding to the first example of the unstable state controlling function.
Figure 4D:
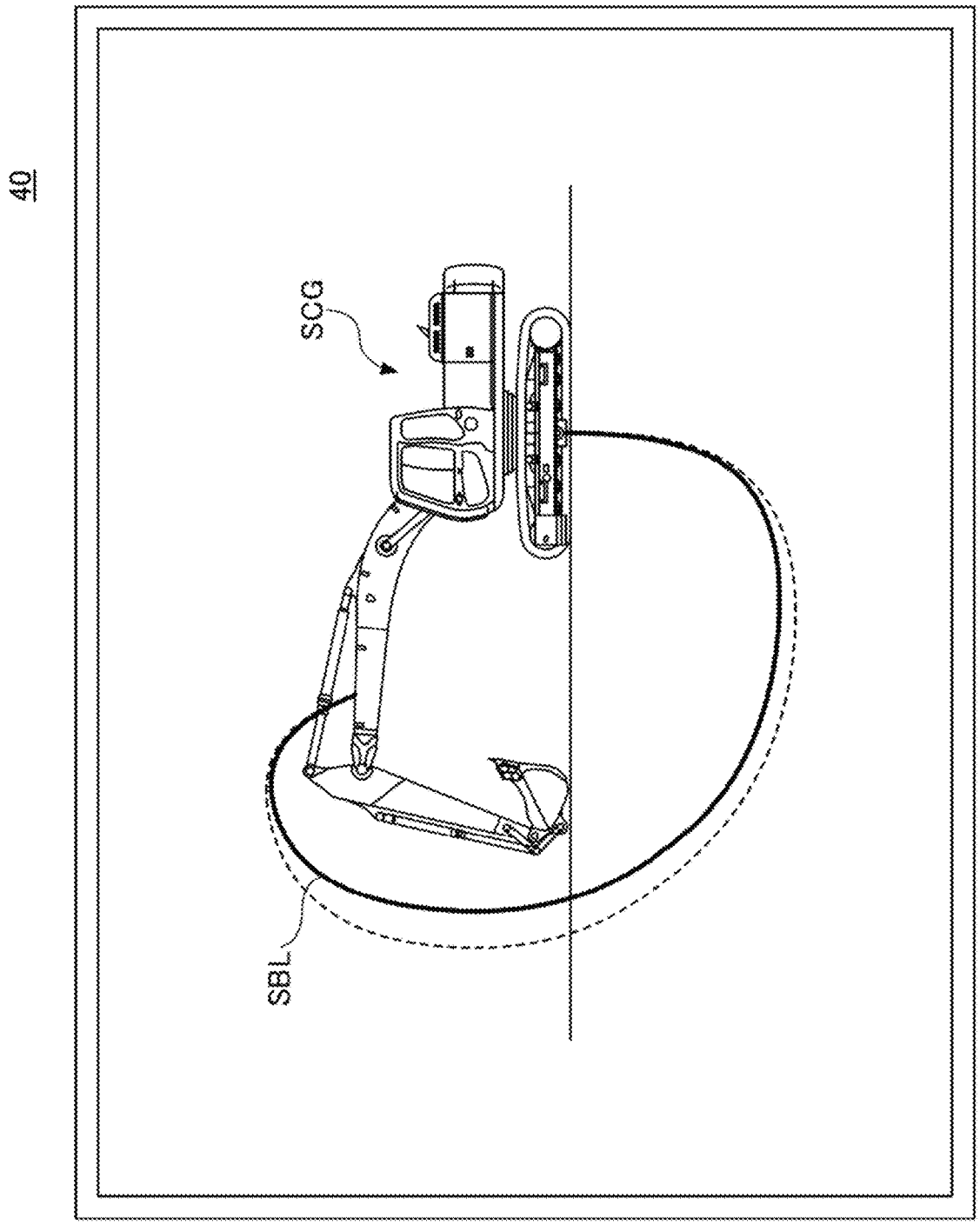
FIG. 4D is a diagram illustrating the other example of the stability range display screen corresponding to the first example of the unstable state controlling function.

FIGS. 4A through 4D are diagrams illustrating specific examples of a screen displaying a stability range (hereinafter "stability range display screen") displayed on the display device 40 corresponding to a first example of the unstable state controlling function. Specifically, FIGS. 4A and 4B are diagrams illustrating examples of the stability range display screen corresponding to the first example of the unstable state controlling function. FIGS. 4A and 4B are specific examples of the stability range display screen, illustrating the stability range in the case where a relatively small load acts on the distal end of the attachment and the stability range in the case where a relatively large load acts on the distal end of the attachment, respectively, in a top view from above the shovel 100. FIGS. 4C and 4D are diagrams illustrating other examples of the stability range display screen corresponding to the first example of the unstable state controlling function. FIGS. 4C and 4D are specific examples of the stability range display screen, illustrating the stability range in the case where a relatively small load acts on the distal end of the attachment and the stability range in the case where a relatively large load acts on the distal end of the attachment, respectively, in a side view from the side of the shovel 100.

According to this example, the stability range of the stability range display screen in FIGS. 4A through 4C corresponds to the reference stability range. The same applies to a second example (FIGS. 5A through 5C) and a third example (FIGS. 6A through 6C) as described below. Furthermore, the dotted line of FIG. 4D, which indicates a stability range boundary line SBL of FIG. 4C for convenience, is not displayed in the actual stability range display screen.

As illustrated in FIGS. 4A and 4B, according to this example, the display device 40 displays the stability range (reference stability range) representing the relationship between the positions that the distal end of the attachment can structurally occupy and the degree of stability of the shovel 100 when the distal end of the attachment is at the positions in a top view from above the shovel 100, under the control of the display control part 305.

Specifically, the top-view stability range display screen includes an image of the shovel 100 as seen from above indicating the orientation of the lower traveling structure 1 and the upper swing structure 3 (hereinafter, shovel image) TCG, equidistant lines EQL indicating equidistant positions from the shovel 100 (the swing axis 2X) at equal intervals, and a stability range boundary line TBL indicating the outer edge of the stability range in a top view. That is, the display device 40 displays the instability range (an example of a second range) more distant from the shovel 100 than the stability range boundary line TBL and the stability range (an example of a first range) closer to the shovel 100 than the stability range boundary line TBL where the degree of stability of the shovel 100 is higher than in the instability range in such a manner as to allow a distinction between the instability range and the stability range, under the control of the display control part 305. In other words, the display device 40 displays the instability range where the movement of the attachment is restricted (the movement speed is relatively low) and the stability range where the movement of the attachment is not restricted (the movement speed is relatively high) in such a manner as to allow a distinction between the instability range and the stability range. The same applies to the below-described top-view stability range display screen in FIGS. 5A, 5C, 6A and 6B. This enables the operator to understand the distance relationship between the shovel 100 and the outer edge of the stability range. Therefore, the controller 30 can encourage the operator to perform operation within the stability range to control the occurrence of the unstable state of the shovel 100.

The relationship between the working range of the attachment and the degree of stability of the shovel 100 (the stability range according to this embodiment) may be displayed on the display device 40 with reference to an arbitrary object or position. For example, as illustrated in FIGS. 4A and 4B, the relationship between the working range of the attachment and the degree of stability of the shovel 100 may be displayed on the display device 40 with the neighborhood of the shovel image TOG corresponding to the shovel 100 (specifically, the attachment position of the attachment on the upper swing structure 3) serving as a reference (center). Furthermore, the relationship between the working range of the attachment and the degree of stability of the shovel 100 may also be displayed on the display device 40, for example, with a work location or the position of a work target of the attachment, such as the unloading position of a suspension load in crane work, serving as a reference (center). The same applies to the below-described side-view stability range display screen and the top-view and the side-view stability range display screen, etc., in second through fifth, seventh, and eighth examples. Furthermore, according to this example, the stability degree calculation is performed on the assumption that the degree of stability of the shovel 100 is constant, being adjusted to the severest condition (a state where the upper swing structure 3 is oriented in the width direction of the lower traveling structure 1), in the swing direction of the upper swing structure 3 about the swing axis 2X. Therefore, in the top-view stability range display screen, the stability range boundary line TBL is represented as a circle equidistant from the swing axis 2X.

The top-view shovel image TCG is displayed in such a manner that the front side of a portion corresponding to the upper swing structure 3, namely, a direction in which the attachment extends in a top view, faces upward in the stability range display screen. Furthermore, the current orientation of the lower traveling structure 1 and the upper swing structure 3 of the shovel 100 may be reflected in the shovel image TCG. Specifically, as illustrated in FIGS. 4A and 4B, according to this example, the upper swing structure 3 of the shovel 100 is oriented in the same direction as the traveling direction (forward traveling direction or backward traveling direction) of the lower traveling structure 1, and the shovel image TCG is displayed in such a manner that the traveling direction of a portion corresponding to the lower traveling structure 1 is upward the same as the upper swing structure 3 in the stability range display screen. When the upper swing structure 3 swings in response to the operator's operation through the operating device 26 to change the orientation of the upper swing structure 3 relative to the lower traveling structure 1 from this state, the orientation of the portion of the shovel image TCG corresponding to the lower traveling structure 1 may change according to the swing motion of the upper swing structure 3 while the orientation of the portion of the shovel image TCG corresponding to the upper swing structure 3 remains fixed. This enables the operator to check the orientation of the upper swing structure 3 relative to the lower traveling structure 1 in real time on the top-view stability range display screen. The same applies to the top-view stability range display screen, etc., in the below-described second through fifth and seventh examples.

On condition that it is possible to have the operator or the like know the orientation of the upper swing structure 3 relative to the lower traveling structure 1, another image (for example, on the assumption that the front of the upper swing structure 3 is so fixed as to face upward, an arrow or the like that indicates the relative orientation of the lower traveling structure 1) may be displayed on the top-view stability range display screen instead of the shovel image TCG. The same applies below to the case of the side-view stability range display screen.

Furthermore, the current pose state of the attachment of the shovel 100 may be reflected in a portion of the top-view shovel image TCG corresponding to the attachment. Specifically, the position of a portion of the top-view shovel image TCG corresponding to the distal end of the attachment corresponds to the current position (distance from the swing axis 2X) of the distal end of the attachment of the shovel 100. When the attachment moves from this state in response to the operator's operation through the operating device 26, the position of the portion of the shovel image TCG corresponding to the distal end of the attachment may change according to the movement of the attachment. This enables the operator to perform work with the shovel 100 while checking in real time whether the position of the distal end of the attachment is within the stability range (inside the stability range boundary line TBL). Therefore, the controller 30 (the display control part 305) can further encourage the operator to perform work within the stability range to further control the occurrence of the unstable state of the shovel 100.

On condition that it is possible to have the operator or the like know the position of the distal end of the attachment, another image (for example, an icon or the like that indicates the position of the distal end of the attachment) may be displayed on the top-view stability range display screen instead of the shovel image TCG. The same applies below to the side-view stability range display screen.

Furthermore, as illustrated in FIGS. 4C and 4D, according to this example, the display device 40 displays the stability range (reference stability range) representing the relationship between the working range of the attachment relative to the machine body and the degree of stability of the shovel 100 in a side view from the side of the shovel 100, under the control of the display control part 305.

The side-view stability range display screen includes a side-view image of the shovel 100 indicating the orientation of the lower traveling structure 1 and the upper swing structure 3 (hereinafter, shovel image) SCG and the stability range boundary line SBL indicating the outer edge of the stability range in a side view. That is, the display device 40 displays the instability range more distant from the shovel 100 than the stability range boundary line SBL and the stability range closer to the shovel 100 than the stability range boundary line SBL where the degree of stability of the shovel 100 is higher than in the instability range in such a manner as to allow a distinction between the instability range and the stability range, under the control of the display control part 305. The same applies to the below-described side-view stability range display screen in FIGS. 5B, 5D and 6C. This enables the operator to understand the distance relationship between the machine body of the shovel 100 and the outer edge of the stability range. Therefore, the controller 30 can encourage the operator to perform operation within the stability range to control the occurrence of the unstable state of the shovel 100.

The side-view shovel image SCG is displayed in such a manner that the orientation (front side) of a portion corresponding to the upper swing structure 3, namely, a direction in which the attachment lies relative to the upper swing structure 3 in a side view, is leftward in the stability range display screen. Furthermore, the current orientation of the lower traveling structure 1 and the upper swing structure 3 of the shovel 100 may be reflected in the shovel image SCG. Specifically, as illustrated in FIGS. 4C and 4D, according to this example, the upper swing structure 3 of the shovel 100 is oriented in the same direction as the traveling direction of the lower traveling structure 1, and the shovel image SCG is displayed in such a manner that the traveling direction (forward traveling direction or backward traveling direction) of a portion corresponding to the lower traveling structure 1 is leftward the same as the upper swing structure 3 in the stability range display screen. When the upper swing structure 3 swings in response to the operator's operation through the operating device 26 to change the orientation of the upper swing structure 3 relative to the lower traveling structure 1 from this state, the orientation of the portion of the shovel image SCG corresponding to the lower traveling structure 1 may change according to the swing motion of the upper swing structure 3 while the orientation of the portion of the shovel image SCG corresponding to the upper swing structure 3 remains fixed. Specifically, the portion of the shovel image TCG corresponding to the lower traveling structure 1 in the stability range display screen may swing in a virtual plane parallel to the lateral direction of the stability range display screen and vertical to a plane corresponding to the stability range display screen in accordance with the swing motion of the upper swing structure 3. This enables the operator to check the orientation of the upper swing structure 3 relative to the lower traveling structure 1 in real time on the side-view stability range display screen. The same applies to the side-view stability range display screen, etc., in the below-described second through fifth, seventh, and eighth examples.

Furthermore, the current pose state of the attachment of the shovel 100 may be reflected in a portion of the side-view shovel image TCG corresponding to the attachment, the same as in the case of the top-view stability range display screen (the shovel image TCG). Specifically, the position of a portion of the side-view shovel image SCG corresponding to the distal end of the attachment corresponds to the current position of the distal end of the attachment of the shovel 100. When the attachment moves from this state in response to the operator's operation through the operating device 26, the position of the portion of the shovel image SCG corresponding to the distal end of the attachment may change according to the movement of the attachment. This enables the operator to perform work with the shovel 100 while checking in real time whether the position of the distal end of the attachment is within the stability range (inside the stability range boundary line SBL), the same as in the case of the top-view stability range display screen. Therefore, the controller 30 (the display control part 305) can further encourage the operator to perform work within the stability range to further control the occurrence of the unstable state of the shovel 100. The same applies to the side-view stability range display screen, etc., in the below-described second through fifth, seventh, and eighth examples.

Furthermore, according to this example, the stability degree calculating part 303 performs the stability degree calculation in view of a load at the distal end of the attachment. Therefore, a load at the distal end of the attachment is considered in the reference stability range set based on a predetermined standard by the stability range setting part 304.

Specifically, as illustrated in FIGS. 4A and 4C, in the case of a relatively small load at the distal end of the attachment, the stability range boundary lines TBL and SBL are relatively distant from a portion of the shovel images TCG and SCG corresponding to the proximal end of the attachment (the upper swing structure 3).

In contrast, as illustrated in FIGS. 4B and 4D, in the case of a relatively large load at the distal end of the attachment, the stability range boundary lines TBL and SBL are relatively close to the portion of the shovel images TCG and SCG corresponding to the proximal end of the attachment (the upper swing structure 3).

That is, the display device 40 displays the stability range (reference stability range) and the instability range in such a manner that the stability range boundary lines TBL and SBL change according to a change in a load at the distal end of the attachment, under the control of the display control part 305. In other words, the display device 40 displays the stability range and the instability range in such a manner that the stability range and the instability range relatively change with reference to the machine body (namely, in such a manner that the boundary between the stability range and the instability range moves toward or away from the shovel 100) according to a change in a load at the distal end of the attachment. Specifically, the display device 40 displays the stability range (the stability range boundary lines TBL and SBL) in such a manner that as a load at the distal end of the attachment increases, the stability range boundary lines TBL and SBL approach a portion of the shovel images TCG and SCG corresponding to the machine body (the lower traveling structure 1 and the upper swing structure 3), that is, the reference stability range narrows. As a load at the distal end of the attachment increases, a tipping moment to tip over the shovel 100 increases. In response, the state of a load at the distal end of the attachment is reflected in the stability range displayed on the display device 40 to enable the operator to intentionally control the manner of operation. Therefore, it is possible to further control the occurrence of the unstable state of the shovel 100.

Furthermore, the display device 40 may display the top-view stability range display screen and the side-view stability range display screen in such a manner that the top-view stability range display screen and the side-view stability range display screen are switchable, under the control of the display control part 305. That is, the display device 40 may, for example, switch the top-view stability range display screen and the side-view stability range display screen in response to the operator's predetermined operation on the input device 42. The same applies in the case of the below-described second through fifth and eighth examples. This makes it possible for the operator to determine the stability range from both a top view and a side view and determine whether the distal end of the attachment is within the stability range, by switching the display content of the display device 40. This makes it easier to operate the attachment within the stability range. Therefore, the controller 30 (the display control part 305) can further control the occurrence of the unstable state of the shovel 100.

Furthermore, the display device 40 may display a stability range display screen that three-dimensionally displays the stability range (hereinafter "three-dimensional stability range display screen") instead of the stability range display screen of at least one of a top view and a side view or in such a manner as to be switchable with the stability range display screen, under the control of the display control part 305. For example, the display device 40 may display a stability range boundary surface corresponding to the boundary of the stability range over a virtual three-dimensional space as seen from the operator seated in the operator seat of the shovel 100. The same applies in the case of the below-described second through fifth and seventh examples. This makes it possible for the operator to three-dimensionally determine the stability range and therefore to more easily operate the attachment within the stability range. Therefore, the controller 30 (the display control part 305) can further control the occurrence of the unstable state of the shovel 100.

Furthermore, the display device 40 may distinguish the stability range and the instability range in a different manner instead of or in addition to the boundary between the stability range and the instability range (the stability range boundary lines TBL and SBL) under the control of the display control part 305. For example, the display device 40 may display the stability range and the instability range in such a manner that the stability range and the instability range are different in color, pattern, the presence or absence of blinking, blinking interval, etc.

Second Example of Unstable State Controlling Function

FIGS. 5A through 5C are diagrams illustrating specific examples of the stability range display screen corresponding to a second example of the unstable state controlling function. Specifically, FIG. 5A is a diagram illustrating an example of the stability range display screen corresponding to the second example of the unstable state controlling function. FIG. 5A is a specific example of the stability range display screen, illustrating the stability range in the case where the upper swing structure 3 of the shovel 100 is oriented in the same direction as the traveling direction (forward traveling direction or backward traveling direction) of the lower traveling structure 1 in a top view from above the shovel 100. FIG. 5B is a diagram illustrating another example of the stability range display screen corresponding to the second example of the unstable state controlling function. FIG. 5B is a specific example of the stability range display screen, illustrating the stability range in the case where the upper swing structure 3 of the shovel 100 is oriented in the same direction as the traveling direction (forward traveling direction or backward traveling direction) of the lower traveling structure 1 in a side view from the side of the shovel 100. FIG. 5C is a diagram illustrating yet another example of the stability range display screen corresponding to the second example of the unstable state controlling function. FIG. 5C is a specific example of the stability range display screen, illustrating the stability range in the case where the upper swing structure 3 of the shovel 100 is oriented perpendicularly to the traveling direction of the lower traveling structure 1 in a top view from above the shovel 100.

According to this example, the stability degree calculating part 303 performs the stability degree calculation in view of the orientation, namely, swing angle, of the upper swing structure 3 relative to the traveling direction (forward traveling direction or backward traveling direction) of the lower traveling structure 1. Therefore, the swing angle of the upper swing structure 3 relative to the lower traveling structure 1 is considered in the reference stability range set based on a predetermined standard by the stability range setting part 304.

For example, as illustrated in FIGS. 5A and 5C, with respect to the top-view stability range boundary line TBL, the distance from a portion of the shovel image TCG corresponding to the proximal end of the attachment (the upper swing structure 3) in a top view changes according to the swing angle when the upper swing structure 3 swings with reference to the lower traveling structure 1. Specifically, when the upper swing structure 3 of the shovel 100 is oriented in the same direction as the traveling direction (forward traveling direction or backward traveling direction) of the lower traveling structure 1 (in the case of FIG. 5A), the top-view stability range boundary line TBL is displayed in such a manner that its boundary position is relatively distant from the portion of the shovel image TCG corresponding to the proximal end of the attachment (the upper swing structure 3). In contrast, when the deviation of the orientation of the upper swing structure 3 from the traveling direction of the lower traveling structure 1 of the shovel 100 increases to some extent, the top-view stability range boundary line TBL is displayed in such a manner that its boundary position is relatively close to the portion of the shovel image TCG corresponding to the proximal end of the attachment (the upper swing structure 3). In particular, when the upper swing structure 3 of the shovel 100 is oriented perpendicularly to the traveling direction of the lower traveling structure 1, that is, when the upper swing structure 3 is oriented in the same direction as the width direction of the lower traveling structure 1 (in the case of FIG. 5C), the top-view stability range boundary line TBL is displayed in such a manner that its boundary position is closest to the portion of the shovel image TCG corresponding to the proximal end of the attachment (the upper swing structure 3).

Furthermore, for example, as illustrated in FIG. 5B, the side-view stability range boundary line SBL includes a stability range boundary line SBL1 corresponding to the current swing angle of the upper swing structure 3 relative to the lower traveling structure 1 and a stability range boundary line SBL2 when the stability degree-related condition is severest, namely, when the upper swing structure 3 is oriented perpendicularly to the traveling direction of the lower traveling structure 1. That is, the stability range boundary line SBL1 corresponding to the current shovel 100 and the stability range boundary line SBL2 when the upper swing structure 3 is oriented perpendicularly to the traveling direction of the lower traveling structure 1 are displayed in the side-view stability range display screen. Furthermore, unlike in this example (FIG. 5B), when the orientation of the upper swing structure 3 is different from the traveling direction (forward traveling direction or backward traveling direction) of the lower traveling structure 1, a stability range boundary line when the stability degree-related condition is laxest, namely, when the upper swing structure 3 is oriented in the same direction as the lower traveling structure 1, may be displayed in addition to the stability range boundary lines SBL1 and SBL2. The same applies in the case of FIG. 6C described below.

That is, the display device 40 displays the stability range (reference stability range) and the instability range in such a manner that the stability range boundary lines SBL1 and SBL2 change according to the swing angle of the upper swing structure 3 relative to the lower traveling structure 1. In other words, the display device 40 displays the stability range and the instability range in such a manner that the stability range and the instability range relatively change with reference to the machine body (namely, in such a manner that the boundary between the stability range and the instability range moves toward or away from the shovel 100). Specifically, the display device 40 displays the stability range in such a manner that as the deviation of the orientation of the upper swing structure 3 (the orientation of a portion of the upper swing structure 3 to which the attachment is attached) from the traveling direction (forward traveling direction or backward traveling direction) of the lower traveling structure 1 increases, the boundary position of the stability range boundary lines TBL and SBL approaches a portion of the shovel images TCG and SCG corresponding to the machine body (the upper swing structure 3) that is the proximal end of the attachment. As described above, the likelihood of the occurrence of the unstable state (the likelihood of the tipping) of the shovel 100 changes according to the orientation of the upper swing structure 3 relative to the traveling direction of the lower traveling structure 1. In response, according to this example, the orientation of the upper swing structure 3 relative to the traveling direction of the lower traveling structure 1 is reflected in the stability range displayed on the display device 40. Therefore, for example, even in a situation where the stability range changes according to the swing motion of the upper swing structure 3, the operator can control the manner of operation such that the distal end of the attachment stays within the stability range while checking the stability range on the display device 40. Accordingly, it is possible to further control the occurrence of the unstable state of the shovel 100 to further increase the safety of the shovel 100. Furthermore, under the condition where the upper swing structure 3 is not oriented perpendicularly to the traveling direction of the lower traveling structure 1, the stability range can be displayed in a laxer manner than in the above-described first example. Therefore, it is possible to increase the work efficiency of the shovel 100.

Furthermore, for example, in excavation work, the attachment has to move back and forth through the swing motion of the upper swing structure 3 between the location of excavation itself and a location where excavated earth is dumped. Therefore, for example, depending on the positional relationship between the location of excavation itself and the dumping location of the shovel 100, one of the working range of the attachment in excavation and the working range of the attachment at the dumping location may be the instability range. In response, according to this example, the orientation of the upper swing structure 3 relative to the traveling direction of the lower traveling structure 1 is reflected in the stability range displayed on the display device 40. Therefore, the operator can, through the stability range displayed on the display device 40, predict and consider such a position of the shovel 100 as to cause both the location of excavation and the dumping location to be in the stability range, while moving the shovel 100. That is, the operator can consider how to proceed with work while checking the stability range displayed on the display device 40. Accordingly, it is possible to improve the work efficiency of the shovel 100.

Furthermore, as described above, the plan-view shovel image TCG may be displayed in such a manner that the front side of its portion corresponding to the upper swing structure 3, namely, a direction in which the attachment extends in a plan view, faces upward in the stability range display screen, to reflect the current orientation of the lower traveling structure 1 and the upper swing structure 3 of the shovel 100. Therefore, as illustrated in FIGS. 5A and 5C, when the upper swing structure 3 swings relative to the lower traveling structure 1, the form of display of the stability range (the stability range boundary line TBL) changes according to the swing motion of the upper swing structure 3. That is, in the stability range display screen, the top-view stability range boundary line TBL turns in a direction opposite to the swing direction with reference to the upper swing structure 3, according to the swing motion of the upper swing structure 3. Furthermore, although not depicted, as described above, the side-view shovel image SCG as well may be displayed in such a manner that the orientation (front side) of its portion corresponding to the upper swing structure 3, namely, a direction in which the attachment lies relative to the upper swing structure 3 in a side view, is leftward in the stability range display screen, to reflect the current orientation of the lower traveling structure 1 and the upper swing structure 3 of the shovel 100. Therefore, when the upper swing structure 3 swings relative to the lower traveling structure 1, the form of display of the stability range (the stability range boundary line SBL) changes according to the swing motion of the upper swing structure 3. That is, in the stability range display screen, the side-view stability range boundary line SBL1 corresponding to the current state of the shovel 100 changes according to the swing motion of the upper swing structure 3. Accordingly, the operator can easily understand a change in the stability range in the case of swinging the upper swing structure 3 with reference to the orientation of the upper swing structure 3 relative to the current traveling direction (forward traveling direction or backward traveling direction) of the lower traveling structure 1, and it is easier for the operator to operate the attachment within the stability range. Thus, the controller 30 (the display control part 305) can further control the occurrence of the unstable state of the shovel 100.

Third Example of Unstable State Controlling Function

Figure 6A:
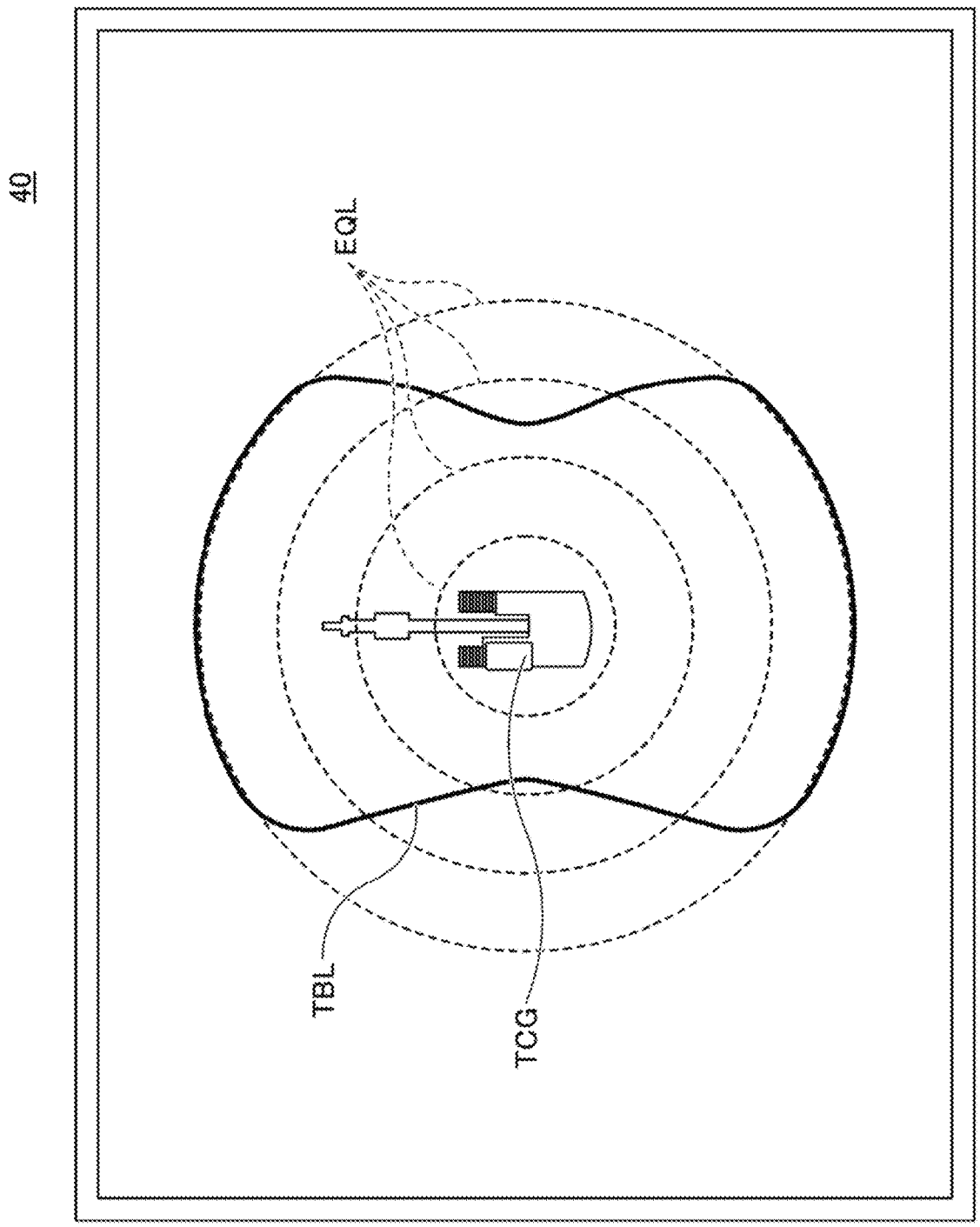
FIG. 6A is a diagram illustrating an example of the stability range display screen corresponding to a third example of the unstable state controlling function.
Figure 6B:
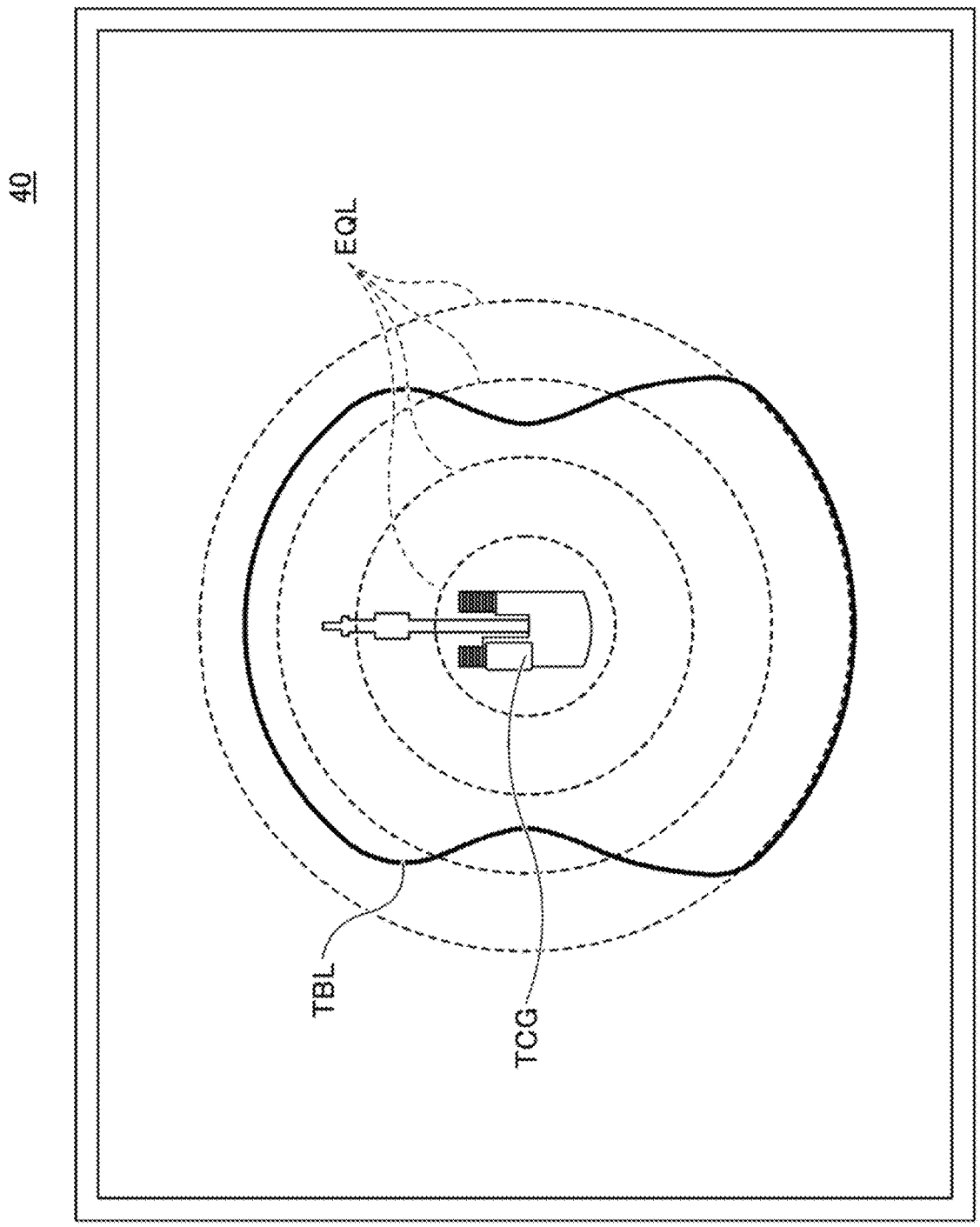
FIG. 6B is a diagram illustrating another example of the stability range display screen corresponding to the third example of the unstable state controlling function.

FIGS. 6A through 6C are diagrams illustrating specific examples of the stability range display screen corresponding to a third example of the unstable state controlling function. Specifically, FIG. 6A is a diagram illustrating an example of the stability range display screen corresponding to the third example of the unstable state controlling function. FIG. 6A is a specific example of the stability range display screen, illustrating the stability range in the case where the work plane of the shovel 100 is inclined to the left of the upper swing structure 3 in a top view from above the shovel 100. FIG. 6B is a diagram illustrating another example of the stability range display screen corresponding to the third example of the unstable state controlling function. FIG. 6B is a specific example of the stability range display screen, illustrating the stability range in the case where the work plane of the shovel 100 is inclined to the front of the upper swing structure 3 in a top view from above the shovel 100. FIG. 6C is a diagram illustrating yet another example of the stability range display screen corresponding to the third example of the unstable state controlling function. FIG. 6C is a specific example of the stability range display screen, illustrating the stability range in the case where the work plane of the shovel 100 is inclined to the front of the upper swing structure 3 in a side view from the side of the shovel 100.

The fine dotted line of FIG. 6C, which indicates the stability range boundary line SBL1 in the case where the work plane of the shovel 100 is not inclined to the front for convenience, is not displayed in the actual stability range display screen.

According to this example, the stability degree calculating part 303 performs the stability degree calculation in view of the tilt state of the machine body (the tilt state of the work plane of the shovel 100), specifically, the tilt state of the upper swing structure 3 detected by the machine body pose sensor S4. Therefore, the tilt state of the machine body (the upper swing structure 3) is considered in the reference stability range set based on a predetermined standard by the stability range setting part 304.

According to this example, the same as in the above-described second example (FIGS. 5A through 5C), the orientation (namely, swing angle) of the upper swing structure 3 relative to the traveling direction (forward traveling direction or backward traveling direction) of the lower traveling structure 1 also is considered in the reference stability range set based on a predetermined standard by the stability range setting part 304. That is, according to this example, the display device 40 displays the stability range (reference stability range) in such a manner that the stability range changes according to the swing angle of the upper swing structure 3 relative to the lower traveling structure 1.

For example, as illustrated in FIG. 6A, when the work plane of the shovel 100 is tilted to the left of the upper swing structure 3, the stability range (the stability range boundary line TBL) is displayed in such a manner that the boundary position of the stability range boundary line TBL as seen from the upper swing structure 3 is closer to the portion of the shovel image TCG corresponding to the proximal end of the attachment (the upper swing structure 3) on the left side than on the right side in the top-view stability range display screen.

Furthermore, for example, as illustrated in FIG. 6B, when the work plane of the shovel 100 is tilted to the front of the upper swing structure 3, the stability range (the stability range boundary line TBL) is displayed in such a manner that the boundary position of the stability range boundary line TBL as seen from the upper swing structure 3 is closer to the portion of the shovel image TCG corresponding to the proximal end of the attachment (the upper swing structure 3) on the front side than on the back side in the top-view stability range display screen.

Furthermore, for example, as illustrated in FIG. 6C, when the work plane of the shovel 100 is tilted to the front of the upper swing structure 3, the stability range (the stability range boundary line SBL) is displayed in such a manner that the boundary position of the stability range boundary line SBL (the stability range boundary lines SBL1 and SBL2) on the front side as seen from the upper swing structure 3 is closer to the portion of the shovel image TCG corresponding to the proximal end of the attachment (the upper swing structure 3) than in the case where the work plane is not tilted in the side-view stability range display screen.

That is, under the control of the display control part 305, the display device 40 displays the stability range (reference stability range) and the instability range in such a manner that the stability range boundary lines TBL and SBL change according to a change in the tilt state of the machine body (the upper swing structure 3). In other words, the display device 40 displays the stability range and the instability range in such a manner that the stability range and the instability range relatively change with reference to the machine body (namely, in such a manner that the boundary between the stability range and the instability range moves toward or away from the shovel 100) according to a change in the tilt state of the machine body (the upper swing structure 3). Specifically, the display device 40 displays the stability range (the stability range boundary lines TBL and SBL) in such a manner that as the tilting of the machine body increases, the boundary position of the stability range boundary lines TBL and SBL in a tilt direction as seen from the machine body is closer to the portion of the shovel images TCG and SCG corresponding to the proximal end of the attachment (the upper swing structure 3). This reflects the tilt state of the machine body in the stability range while the likelihood of the tipping of the shovel 100 changes according to the tilt state of the machine body. Therefore, it is possible to further control the tipping of the shovel 100. Furthermore, the operator can understand the tilt state of the work plane of the shovel 100 by looking at the lopsidedness of the stability range boundary line TBL with reference to the portion of the shovel image TCG corresponding to the proximal end of the attachment (the upper swing structure 3) in the top-view stability range display screen.

While crane work is performed with the horizontalness of the work plane of the shovel 100 being ensured, the stability range (FIGS. 6A through 6C) in which the tilt state of the machine body is considered may be displayed on the display device 40 also in the case of performing crane work. This is because, for example, when such an unforeseen situation where the work plane tilts for some reason occurs during crane work, the controller 30 has to encourage the operator to suitably operate the attachment in response to the unforeseen situation. For the same reason, the stability range that takes the tilt of the machine body into account may also be used with respect to the stability range associated with the below-described unstable state controlling control function. Furthermore, according to this example, the stability range may be displayed without taking the swing angle of the upper swing structure 3 relative to the lower traveling structure 1 into account, the same as in the case of the above-described first example (FIGS. 4A through 4D).

Furthermore, according to the example, as illustrated in FIG. 6C, the forward or backward tilt state of the upper swing structure 3 may be reflected in the shovel image SCG in the side-view stability range display screen. Specifically, as illustrated in FIG. 6C, when the work plane of the shovel 100 tilts to the front of the upper swing structure 3, the shovel image SCG may be displayed with a forward tilt commensurate with the tilt angle. Furthermore, when the work plane of the shovel 100 tilts to the back of the upper swing structure 3, the shovel image SCG may be displayed with a backward tilt commensurate with the tilt angle. This enables the operator or the like to understand the tilt state of the machine body (the upper swing structure 3) of the shovel 100.

On condition that it is possible to have the operator or the like understand the tilt state of the machine body (the upper swing structure 3) of the shovel 100, another image (for example, an arrow indicating a tilt direction or a line segment indicating a tilted work plane) may be displayed in the side-view stability range display screen, instead of the shovel image SCG being tilted.

Fourth Example of Unstable State Controlling Function

As described above, the stability degree calculating part 303 may perform the stability degree calculation in view of at least one of multiple items including the engine operating state information and the operation tendency information in addition to a load at the distal end of the attachment, the tilt state of the machine body, and the orientation of the upper swing structure 3 relative to the traveling direction of the lower traveling structure 1. Therefore, at least one of the above-described multiple items may be considered in the reference stability range set based on a predetermined standard set by the stability range setting part 304.

That is, the display device 40 may display the stability range and the instability range in at least one of a top view and a side view or three-dimensionally, in view of the multiple items including the engine operating state information and the operation tendency information in addition to a load at the distal end of the attachment, the tilt state of the machine body, and the orientation of the upper swing structure 3 relative to the traveling direction of the lower traveling structure 1, under the control of the display control part 305.

For example, the display device 40 may display the stability range (reference stability range) and the instability range (for example, a stability range boundary line serving as the outer edge of the stability range) in view of the movement speed-related information under the control of the display control part 305. Specifically, the display device 40 may display the stability range and the instability range in such a manner that the stability range and the instability range (namely, the stability range boundary line) change with reference to the machine body (namely, in such a manner that the boundary between the stability range and the instability range moves toward or away from the shovel 100) according to a change in the movement speed-related information. More specifically, the display device 40 may display the stability range and the instability range, for example, in such a manner that as the movement speed of the attachment corresponding to the movement speed-related information relatively increases, the boundary of the stability range approaches a portion of the shovel image corresponding to the proximal end of the attachment (the upper swing structure 3), namely, in such a manner that the stability range narrows. As a result, while the likelihood of the occurrence of the unstable state of the shovel 100 can change according to the movement speed of the attachment as described above, the movement speed of the attachment is reflected in the stability range. Therefore, it is possible to further control the occurrence of the unstable state of the shovel 100.

Furthermore, for example, the display device 40 may display the stability range (reference stability range) and the instability range in view of the operation tendency information under the control of the display control part 305. Specifically, the display device 40 may display the stability range and the instability range in such a manner that the stability range and the instability range change with reference to the machine body (namely, in such a manner that the boundary between the stability range and the instability range moves toward or away from the shovel 100) according to a change in the operation tendency information. More specifically, the display device 40 may display the stability range, for example, in such a manner that as the degree of carefulness represented by the operator's operation tendency corresponding to the operation tendency information decreases, the boundary of the stability range approaches a portion of the shovel image corresponding to the proximal end of the attachment (the upper swing structure 3). As a result, while the likelihood of the tipping of the shovel 100 changes according to the operator's tendency to operate the attachment through the operating device 26 as described above, the operation tendency information is reflected in the stability range. Therefore, it is possible to further control the tipping of the shovel 100.

Fifth Example of Unstable State Controlling Function

Figure 7:
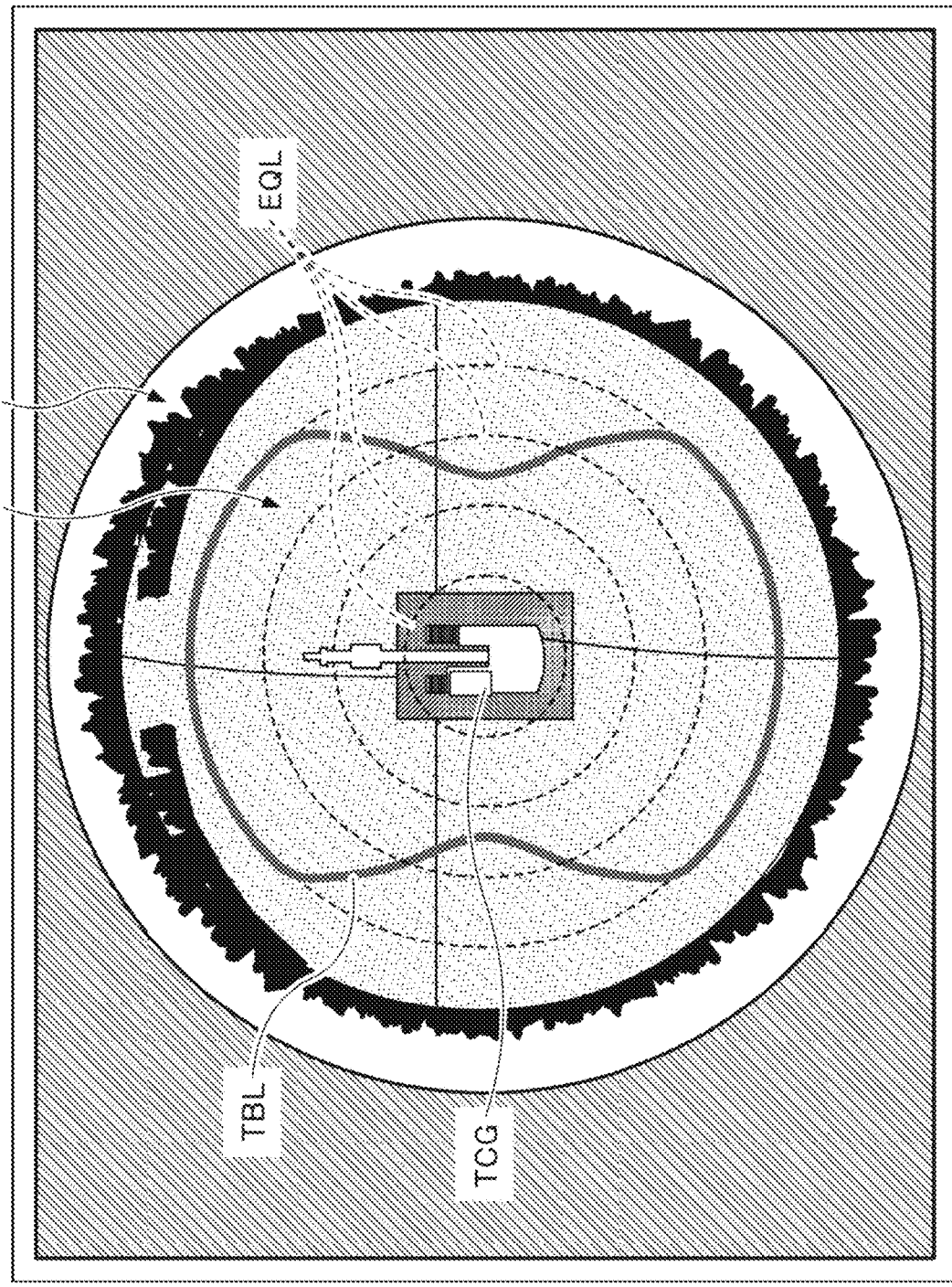
FIG. 7 is a diagram illustrating an example of the stability range display screen corresponding to a fifth example of the unstable state controlling function.

FIG. 7 is a diagram illustrating a specific example of the stability range display screen displayed on the display device 40 corresponding to a fifth example of the unstable state controlling function. Specifically, FIG. 7 is a diagram illustrating an example of the stability range display screen corresponding to the fifth example of the unstable state controlling function, and is a specific example of the top-view stability range display screen showing the stability range that takes the orientation of the upper swing structure 3 relative to the traveling direction (forward traveling direction or backward traveling direction) of the lower traveling structure 1 into account, the same as in the case of the above-described second example (FIG. 5A).

According to this example, the display device 40 displays a viewpoint change image generated from images captured by the image capturing device S5 (the cameras S5B, S5F, S5L, and S5R) as the background of the top-view stability range display screen under the control of the display control part 305. In other words, the display device 40 displays the stability range display screen in such a manner that the stability range boundary line TBL (the stability range and the instability range) is superimposed and displayed over the viewpoint change image generated from images captured by the image capturing device S5 by the display control part 305.

Specifically, as illustrated in FIG. 7, the display control part 305 generates a viewpoint change image EP into which an overhead view image BVP looking at an area surrounding and adjoining the shovel 100 from directly above and a horizontal image HVP looking at the surrounding area horizontally from the shovel 100 and placed around the overhead view image BVP are combined. The viewpoint change image EP is generated based on respective captured images of the cameras S5B, S5F, S5L, and S5R, using a known viewpoint change process and a known synthesizing process. Specifically, the viewpoint change image EP is obtained by projecting respective captured images of the cameras S5B, S5F, S5L, and S5R onto a spatial model and re-projecting the projected images projected onto the spatial model onto another two-dimensional plane. The spatial model is where a captured image is to be projected in a virtual space and is constituted of one or more flat or curved surfaces including a flat or curved surface other than a flat surface in which the captured image is positioned. The display device 40 displays the generated viewpoint change image EP around the shovel image TCG in accordance with the positional relationship as seen from the shovel 100, as the background image of the stability range boundary line TBL and the equidistant lines EQL, under the control of the display control part 305. This enables the operator to know the current situation around the shovel 100 and the top-view stability range (the relationship between the positions that the distal end of the attachment can structurally occupy and the degree of stability of the shovel 100 when the distal end of the attachment is at the positions) simultaneously.

Likewise, the display device 40 may display a viewpoint change image generated from images captured by the image capturing device S5 (the cameras S5B, S5F, S5L and S5R) as the background of the side-view stability range display screen illustrated in FIG. 5B, under the control of the display control part 305. In other words, the display device 40 may display the side-view stability range display screen in such a manner that the stability range is superimposed and displayed over the viewpoint change image generated from images captured by the image capturing device S5 by the display control part 305.

Specifically, the display control part 305 generates a viewpoint change image looking horizontally (looking from the side of the shovel 100) at the surrounding area of the shovel 100. The same as in the case of the above-described viewpoint change image EP, the viewpoint change image is generated based on respective captured images of the cameras S5B, S5F, S5L, and S5R, using a known viewpoint change process and a known synthesizing process. The display device 40 then displays the generated viewpoint change image EP around the shovel image SCG in accordance with the positional relationship as seen from the shovel 100, as the background image of the stability range boundary line SBL, under the control of the display control part 305. This enables the operator to likewise know the current situation around the shovel 100 and the side-view stability range (the relationship between the positions that the distal end of the attachment can structurally occupy and the degree of stability of the shovel 100 when the distal end of the attachment is at the positions) simultaneously.

Furthermore, the same configuration may be applied to the above-described first, third, and fourth examples and the below-described seventh and eighth examples. That is, the display device 40 may display a viewpoint change image generated from images captured by the image capturing device S5 as the background of the stability range display screen in the top-view or side-view stability range display screen in which a desired item that affects the degree of stability of the shovel 100 is considered.

Furthermore, the same configuration may also be applied to a desired display screen that three-dimensionally shows the relationship between the working range of the attachment and the degree of stability of the shovel 100, such as the three-dimensional stability range display screen. For example, the display device 40 may display a stereoscopic image of the surroundings generated from images captured by the image capturing device S5, using a known stereoscopic process, a synthesizing process, etc., and superimpose and display a stability range boundary surface corresponding to the above-described boundary of the stability range, over a virtual three-dimensional space as seen from the operator seated in the operator seat of the shovel 100, under the control of the display control part 305.

The display device 40 may display a top-view or side-view background image including a computer-generated graphic that imitates a work site instead of a viewpoint change image generated based on images captured by the image capturing device S5 in the top-view or side-view stability range display screen, under the control of the display control part 305. Likewise, the display device 40 may display a background image including a computer-generated graphic that imitates a work site as seen from the operator seated in the operator seat of the shovel 100 instead of a stereoscopic image generated based on images captured by the image capturing device S5 in the three-dimensional stability range display screen, under the control of the display control part 305.

Sixth Example of Unstable State Controlling Function

Figure 8A:
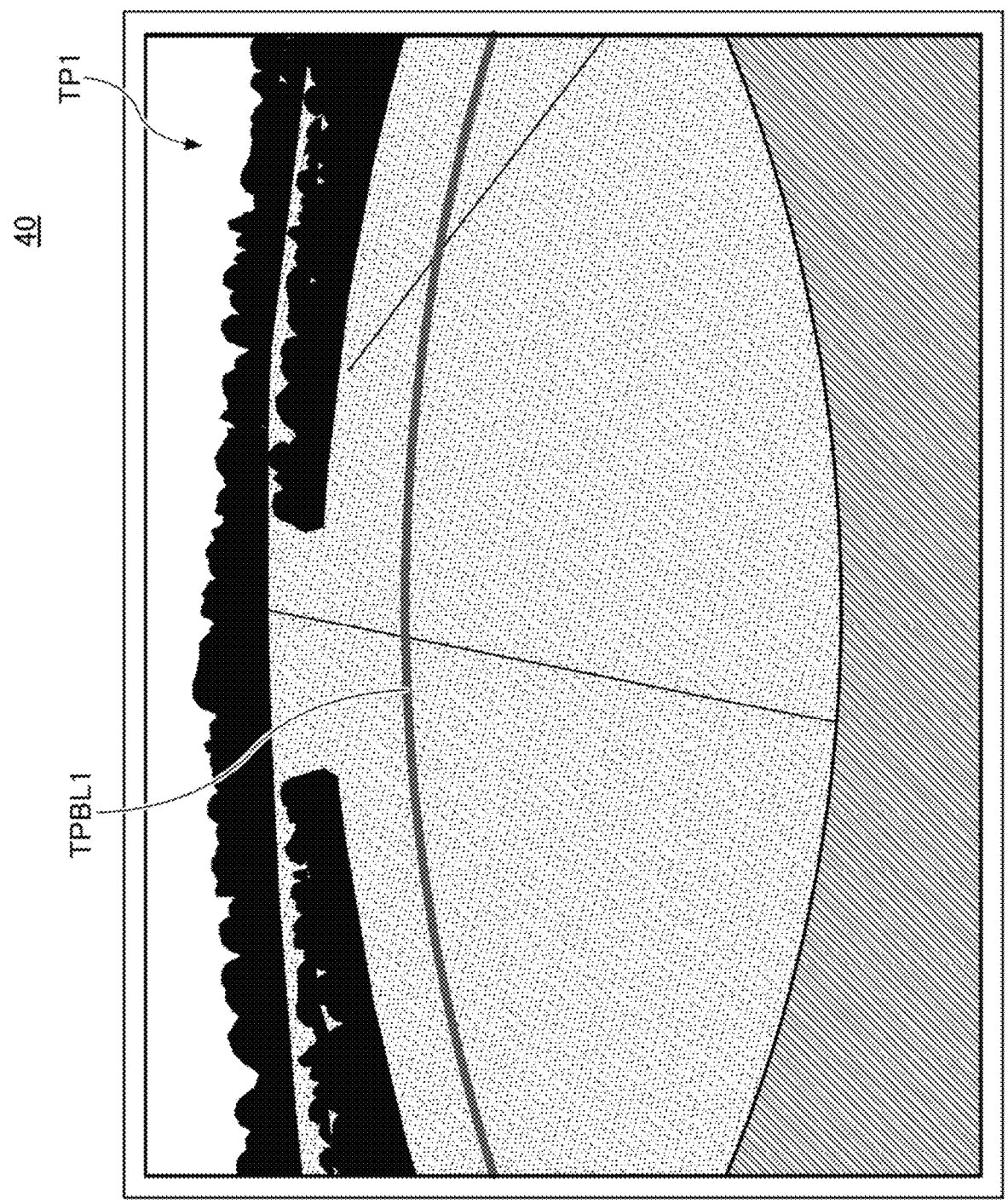
FIG. 8A is a diagram illustrating an example of the stability range display screen corresponding to a sixth example of the unstable state controlling function.
Figure 8B:
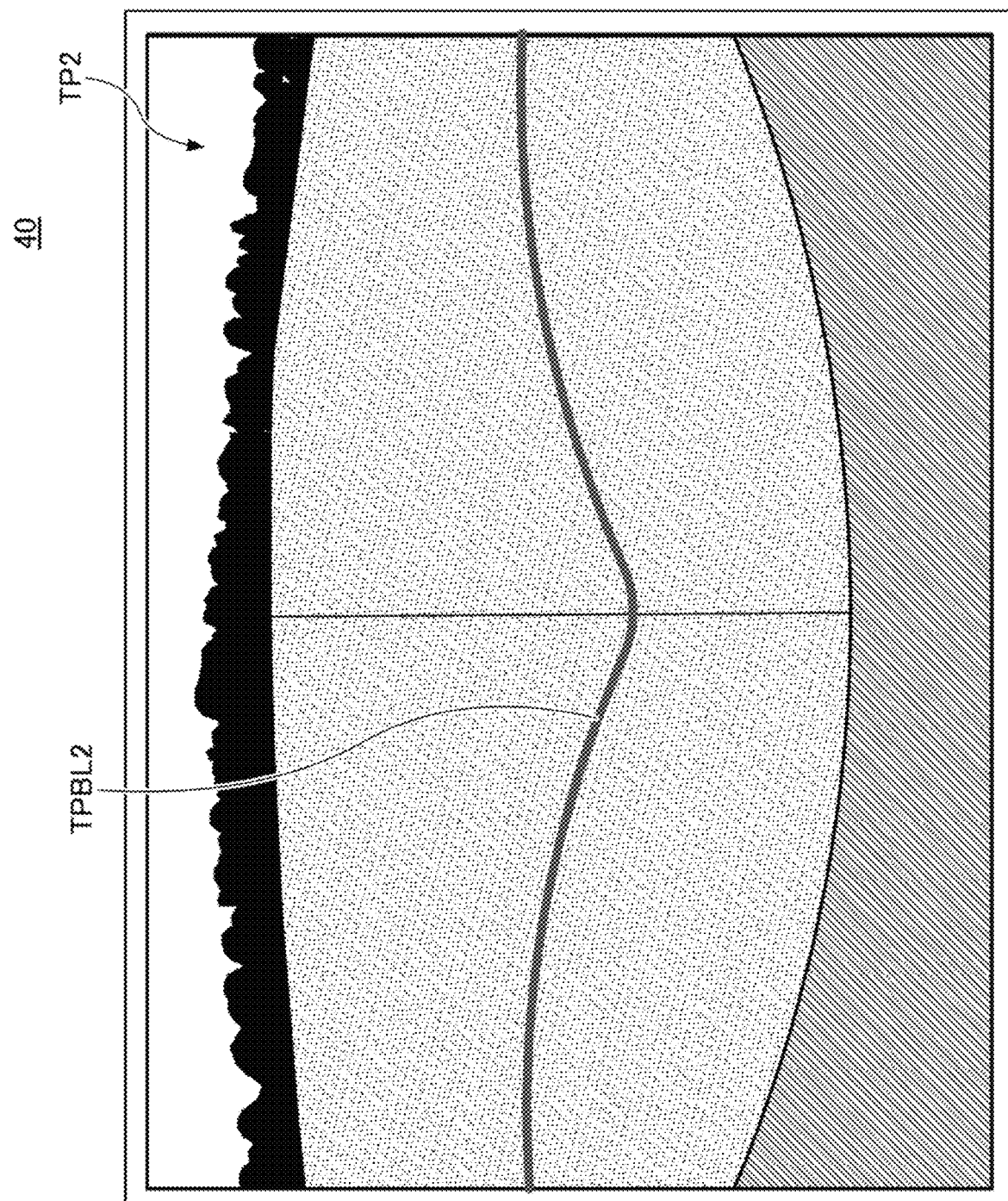
FIG. 8B is a diagram illustrating another example of the stability range display screen corresponding to the sixth example of the unstable state controlling function.

FIGS. 8A and 8B are diagrams illustrating specific examples of the stability range display screen displayed on the display device 40, corresponding to a sixth example of the unstable state controlling function. Specifically, FIGS. 8A and 8B are diagrams illustrating an example and another example of the stability range display screen corresponding to the sixth example of the unstable state controlling function. FIGS. 8A and 8B are specific examples of the stability range display screen showing the stability range that takes the orientation of the upper swing structure 3 relative to the traveling direction (forward traveling direction or backward traveling direction) of the lower traveling structure 1 into account, the same as in the case of the above-described second example.

According to this example, the display device 40 directly displays an image captured by the image capturing device S5 (specifically, an image captured by at least one of the cameras S5B, S5F, S5L, and S5R), and superimposes and displays a stability range boundary line (the stability range and the instability range) in accordance with the relative positions of an imaging range corresponding to the captured image and the shovel 100. This enables the operator to know the current situation around the shovel 100 and the stability range (the relationship between the positions that the distal end of the attachment can structurally occupy and the degree of stability of the shovel 100 when the distal end of the attachment is at the positions) simultaneously, the same as in the above-described fifth example.

Specifically, according to the example illustrated in FIG. 8A, the display device 40 displays a through-the-lens image TP1 corresponding to an image captured by the camera S5F or the camera S5B, namely, the through-the-lens image TP1 showing the front or back of the upper swing structure 3, under the control of the display control part 305. The display device 40 also displays a stability range boundary line TPBL1 indicating the outer edge of the stability range in accordance with a relative position from the shovel 100 on the through-the-lens image TP1.

Furthermore, according to another example illustrated in FIG. 8B, the display device 40 displays a through-the-lens image TP2 corresponding to an image captured by the camera S5L or the camera S5R, namely, the through-the-lens image TP2 showing the left side or right side of the upper swing structure 3, under the control of the display control part 305. The display device 40 also displays a stability range boundary line TPBL2 indicating the outer edge of the stability range in accordance with a relative position from the shovel 100 on the through-the-lens image TP2.

According to this example, the display device 40 displays the stability range (the stability range boundary lines TPBL1 and TPBL2) in which the orientation of the upper swing structure 3 relative to the traveling direction (forward traveling direction or backward traveling direction) of the lower traveling structure 1 is considered, the same as in the case of the above-described second example, under the control of the display control part 305. Therefore, the positional relationship as seen from the shovel 100 differs between the stability range boundary line TPBL1 superimposed over the image captured by the camera S5F or S5B (the through-the-lens image TP1) and the stability range boundary line TPBL2 superimposed over the image captured by the camera S5L or S5R (the through-the-lens image TP2). Therefore, the operator can check the stability range in each of the directions (forward, backward, leftward, and rightward) as seen from the upper swing structure 3 by switching the type of a through-the-lens image displayed on the display device 40 (an image captured by one of the cameras S5B, S5F, S5L, and S5R) through a predetermined operation on the input device 42. Furthermore, the display device 40 may display multiple types of through-the-lens images, namely, multiple through-the-lens images corresponding to images captured by two or more of the cameras S5B, S5F, S5L, and S5R; and superimpose and display a stability range boundary line (the stability range and the instability range) over each through-the-lens image, under the control of the display control part 305. This enables the operator to check the stability range simultaneously in multiple directions as seen from the upper swing structure 3. This enables the operator to check the stability range simultaneously in multiple directions as seen from the upper swing structure 3.

The display device 40 may display a background image including a computer-generated graphic that imitates a work site corresponding to an imaging range as seen from the upper swing structure 3 of a through-the-lens image instead of a through-the-lens image corresponding to an image captured by the image capturing device S5, and superimpose and display the stability range and the instability range (for example, the boundary line of the stability range and the instability range) over the background image, under the control of the display control part 305.

Seventh Embodiment of Unstable State Controlling Function

FIG. 9 is a diagram illustrating a specific example of the stability range display screen corresponding to a seventh example of the unstable state controlling function. Specifically, FIG. 9 is a diagram illustrating an example of the stability range display screen corresponding to the seventh example of the unstable state controlling function, and is a specific example of the top-view and the side-view stability range display screen showing the stability range in which the orientation of the upper swing structure 3 relative to the traveling direction (forward traveling direction or backward traveling direction) of the lower traveling structure 1 is considered, the same as in the case of the above-described second example (FIGS. 5A and 5B).

According to this example, the display device 40 displays the top-view stability range display screen and the side-view stability range display screen of the above-described second example simultaneously under the control of the display control part 305. This enables the operator to understand the stability range from both a top view and a side view at the same time and determine whether the distal end of the attachment is within the stability range, thus making it easier to operate the attachment within the stability range. Therefore, the controller 30 (the display control part 305) can further control the occurrence of the unstable state of the shovel 100.

The top-view and the side-view stability range display screen may be placed as desired in the display area of the display device 40. For example, when the top-view and the side-view stability range display screen are laterally arranged in the display area of the display device 40 as illustrated in FIG. 9, the order of left-right arrangement may be determined as desired, and the side-view stability range display screen may be displayed on the left side and the top-view stability range display screen may be displayed on the right side. Furthermore, the top-view and the side-view stability range display screen may also be vertically arranged in the display area of the display device 40, and the order of top-bottom arrangement of the top-view and the side-view stability range display screen may also be determined as desired.

The same configuration may also be applied to the top-view and the side-view stability range display screen in the above-described first and third through fifth examples.

Eighth Example of Unstable State Controlling Function

The display device 40 may display, instead of or in addition to the above-described stability range, the relationship between the positions that the distal end of the attachment can structurally occupy and the degree of stability of the shovel 100 when the distal end of the attachment is at the positions (namely, the relationship between the working range of the attachment relative to the machine body and the degree of stability of the shovel 100) in another manner. That is, on condition that it is possible to encourage the operator to perform operation that can further stabilize the pose of the shovel 100 to control the unstable state of the shovel 100, the display device 40 may display the relationship between the positions that the distal end of the attachment can structurally occupy and the degree of stability of the shovel 100 when the distal end of the attachment is at the positions in any manner. In this case, it goes without saying that the manner of displaying the stability range display screen in the above-described fifth through seventh examples may suitably be applied to the display screen of the display device 40 that displays the relationship between the working range of the attachment relative to the machine body and the degree of stability of the shovel 100 in a desired manner.

For example, the display device 40 may display three or more ranges separated in a graduated manner based on the magnitude of the stability degree in the working range of the attachment with reference to the machine body in such a manner that the ranges are distinguishable, under the control of the display control part 305. In this case, the display device 40 may display the ranges in such a manner that the ranges are different from each other in color, pattern, the presence or absence of blinking, blinking interval, etc., the same as in the above-described case of distinguishing the stability range and the instability range, under the control of the display control part 305.

Specifically, the stability range may be further divided into a first stability range where the stability degree is relatively high and a second stability range that is lower in stability degree than the first stability range and for alerting the operator. In this case, the display device 40 may display the boundary between the first stability range and the second stability range in addition to the boundary between the stability range (the second stability range) and the instability range in the stability range display screen, under the control of the display control part 305. This enables the operator to understand the relationship between the boundary between the first stability range and the second stability range and the position of the distal end of the attachment to operate the attachment within the first stability range where the degree of stability of the shovel 100 is higher. Accordingly, the controller 30 (the display control part 305) can further control the occurrence of the unstable state of the shovel 100.

Furthermore, the instability range may be further divided into a first instability range where the stability degree is relatively high and a second instability range lower in stability degree than the first instability range where the movement of the shovel 100 is stopped by the unstable state controlling control part 306 on condition that the degree of departure is relatively high. In this case, the display device 40 may display the boundary between the first instability range and the second instability range, namely, a boundary corresponding to the condition when the unstable state controlling control part 306 stops the movement of the shovel 100 on condition that the degree of departure is relatively high, in addition to the boundary between the stability range and the instability range in the stability range display screen, under the control of the display control part 305. This enables the operator to understand the relationship between the boundary between the first instability range and the second instability range (a boundary condition for stopping the movement of the shovel 100) and the position of the distal end of the attachment.

Furthermore, for example, the display device 40 may display contour lines (contours) of the stability degree around a shovel image instead of a stability range boundary line or with reference to a stability range boundary line under the control of the display control part 305. In other words, the display device 40 may display multiple ranges separated by contour lines of the stability degree based on the magnitude of the stability degree.

Furthermore, for example, in the case of displaying two or more ranges that are graduated based on the magnitude of the stability degree, the display device 40 may specifically display (the rough indication of) the stability degree of each of the ranges under the control of the display control part 305. For example, the display device 40 may display the numerical value of the stability degree corresponding to the boundary between ranges. Furthermore, for example, the display device 40 may display the boundary between ranges with a corresponding stability degree range color among multiple colors assigned to the ranges of the stability degree. Furthermore, for example, the display device 40 may display each of the ranges with a corresponding stability degree range color among multiple range colors assigned to the ranges of the stability degree. Furthermore, for example, the display device 40 may display a name indicating a range of the stability degree (for example, "HIGH STABILITY RANGE" of a relatively high stability degree, "CAUTION RANGE" of a medium stability degree, "INSTABILITY RANGE" of a relatively low stability degree, or the like) for each range of the stability degree. Furthermore, for example, the display device 40 may assign each of the ranges a corresponding stability degree range blinking interval from among blinking intervals assigned to the ranges of the stability degree, and may blink and display each of the ranges. That is, the display device 40 may specifically display stability degree corresponding to multiple ranges using at least one of color, a numerical value, text information indicating whether the stability degree is high or low, a blinking interval, etc., under the control of the display control part 305.

Furthermore, for example, the display device 40 may display a heat map or the like that shows the magnitude of the stability degree with reference to the machine body instead of the boundary of the stability range or in addition to the boundary of the stability range under the control of the display control part 305.

[Unstable State Controlling Control Process]

Next, a control process with respect to the unstable state controlling function (hereinafter "unstable state controlling control process") is described with reference to FIG. 10.

Figure 10:
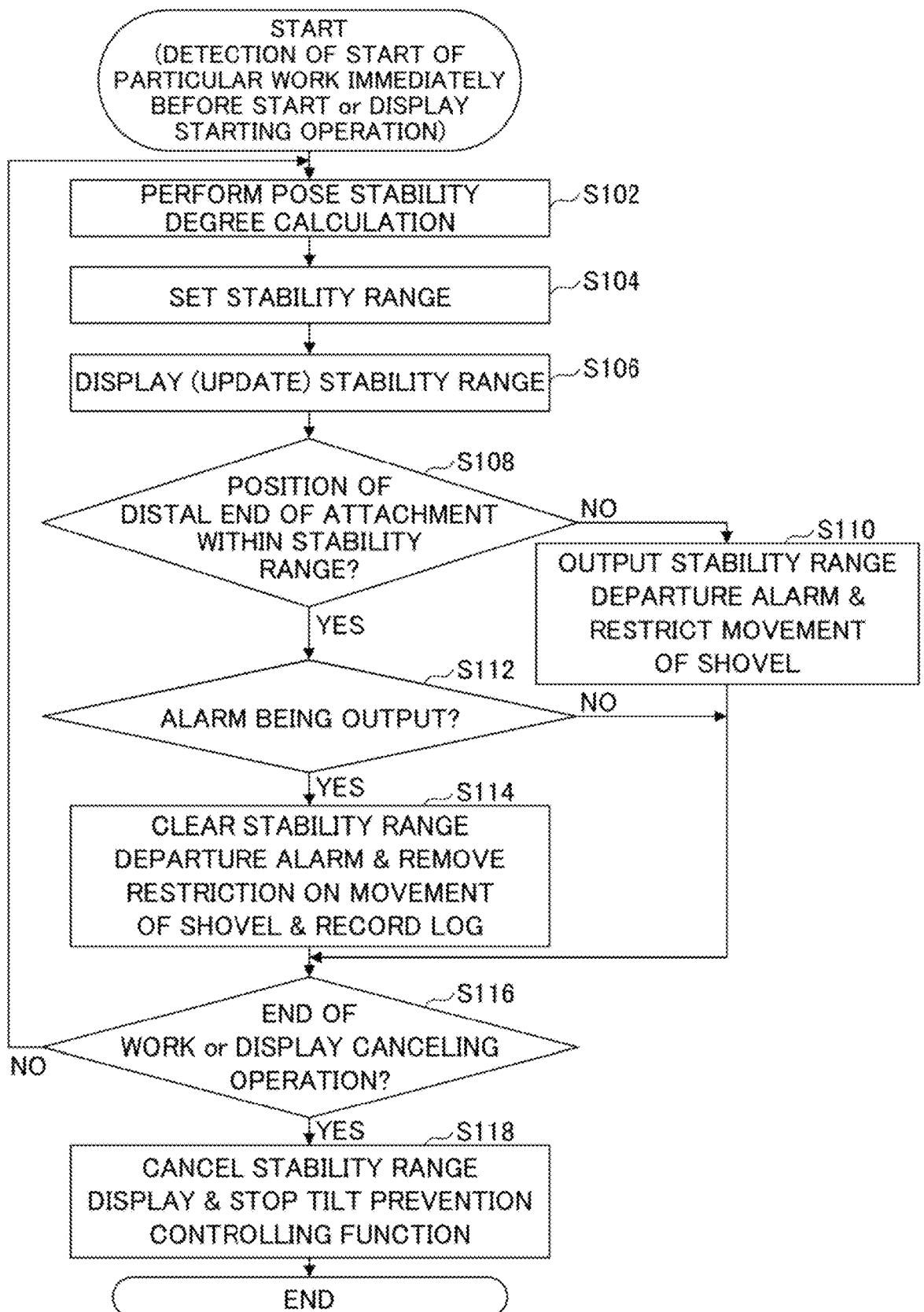
FIG. 10 is a flowchart schematically illustrating an example of an unstable state controlling control process executed by a controller.

FIG. 10 is a flowchart schematically illustrating an example of the unstable state controlling control process executed by the controller 30.

For example, in response to detecting that the shovel 100 starts particular work, the controller 30 starts the flowchart before the start of the particular work.

The particular work may include any work performed by the shovel 100. Various work environments can be assumed for the shovel 100, and the tipping of the shovel 100 may occur in any work. In particular, the particular work includes work of the shovel 100 that is likely to cause the tipping of the shovel 100. Specifically, the particular work includes crane work, forming work that forms (levels) a slope or the like, excavation work that performs excavation at a position deeper than the ground contacted by the lower traveling structure 1 of the shovel 100, work in a situation where a surrounding area includes a raised or lowered part such as a cliff, etc.

For example, the controller 30 may detect that crane work starts based on various kinds of input information. Specifically, the controller 30 may detect that crane work starts when the operating mode of the shovel 100 is switched to the crane mode by the operation of turning on the crane mode switch 42a. Furthermore, the controller 30 may also detect that crane work starts when a load measuring operation is performed through the input device 42 after a suspension load is suspended from the hook 80 (namely, slinging work is performed). In this case, the controller 30 may determine that slinging work has been performed based on an image captured by the image capturing device S5 or may determine that slinging work has been performed in response to a load measuring operation being performed while the operating mode of the shovel 100 is the crane mode. Furthermore, in this case, the controller 30 performs pose stability degree calculation based on a load acting on the distal end of the attachment (namely, the weight of the suspension load) measured by the load measuring part 301 in response to the load measuring operation (step S102 described below). The controller 30 may also detect that crane work starts by automatically determining whether crane work starts based on an image captured by the image capturing device S5. In this case, the controller 30 may determine whether crane work starts based on work pattern information that may be extracted by machine learning or the like from the past captured images of the image capturing device S5 of the shovel 100 stored in the shovel 100 or in an external apparatus (for example, a server apparatus) connected to the shovel 100 in such a manner as to be able to communicate with the shovel 100.

Likewise, with respect to other types of particular work as well, the controller 30 may detect that the particular work starts in response to an operation on an operating part that may be included in the input device 42 and represents the execution (start) of a work mode corresponding to the particular work being performed on an operating part. Furthermore, with respect to other types of particular work as well, the controller 30 may detect that the particular work starts by determining whether crane work starts based on work pattern information that may be extracted by machine learning or the like from the past captured images of the image capturing device S5 of the shovel 100.

Furthermore, the controller 30 starts the flowchart when a predetermined operation for displaying the stability range display screen on the display device 40 (hereinafter "stability range display starting operation") is performed through the input device 42.

As illustrated in FIG. 10, at step S102, the stability degree calculating part 303 performs the stability degree calculation.

At step S104, the stability range setting part 304 sets the stability range based on the calculation result of the stability degree calculating part 303.

At step S106, the display control part 305 displays the stability range display screen on the display device 40 based on the stability range set by the stability range setting part 304.

At step S108, the unstable state controlling control part 306 determines whether the position of the distal end of the attachment is within the stability range. The unstable state controlling control part 306 proceeds to step S110 if the position of the distal end of the attachment is not within the stability range, and proceeds to step S112 if the position of the distal end of the attachment is within the stability range.

At step S110, the unstable state controlling control part 306 starts outputting the stability range departure alarm and starts restricting the movement of the shovel 100, and proceeds to step S116.

In the process of this step, if the outputting of the stability range departure alarm and the restricting of the movement of the shovel 100 have already been started, the unstable state controlling control part 306 continues the state.

At step S112, the unstable state controlling control part 306 determines whether the stability range departure alarm is being output (that is, the movement of the shovel 100 is being restricted). The unstable state controlling control part 306 proceeds to step S114 if the stability range departure alarm is being output, and otherwise, proceeds to step S116.

At step S114, the unstable state controlling control part 306 cancels the output of the stability range departure alarm and the restriction on the movement of the shovel 100, and the instability log recording part 307 records various kinds of information to be recorded between the departure of the distal end of the attachment from the stability range and the return of the distal end of the attachment into the stability range, and proceeds to step S116.

At step S116, the controller 30 determines whether one of the conditions, namely, the end of the particular work or the execution of a predetermined operation for canceling the display of the stability range display screen on the display device 40 (hereinafter "stability range display canceling operation") through the input device 42 by the operator or the like, holds. At this point, the controller 30 may detect the stop of the particular work in response to an operation on an operating part that may be included in the input device 42 and represents the stop (cancellation) of a work mode corresponding to the particular work. Furthermore, the controller 30 may detect the end of the particular work by determining whether the particular work has ended based on the above-described work pattern information that may be extracted by machine learning or the like from the past captured images of the image capturing device S5 of the shovel 100. The controller 30 proceeds to step S118 if the particular work has ended or the stability range display canceling operation has been performed through the input device 42 by the operator or the like, and otherwise, returns to step S102 to repeat the process of steps S102 through S116.

At step S118, the display control part 305 cancels (ends) the display of the stability range display screen on the display device 40 and the unstable state controlling control part 306 stops the unstable state controlling control function (corresponding to the process of steps S108 through S114) and ends the process of this time.

Thus, according to this example, the display control part 305 displays the above-described stability range display screen on the display device 40 before the start of predetermined work (particular work).

This enables the operator or the like to, for example, know the state of the stability range as seen from the shovel 100 (the upper swing structure 3) by checking the stability range display screen when starting particular work. Therefore, the operator or the like can relatively easily determine how to proceed with the particular work for its efficient performance while maintaining a relatively high degree of stability of the shovel 100. For example, by using the stability range display screen, the operator or the like can relatively easily determine where to position the shovel 100 within a work area in which the shovel 100 performs particular work to be able to proceed with the particular work with a minimum amount of movement or operation while maintaining a relatively high degree of stability of the shovel 100. Furthermore, when the stability range is superimposed over a captured image captured by the image capturing device S5 or over a viewpoint change image or a stereoscopic image generated based on the captured image as described above, the operator or the like can know the stability range and the actual situation around the shovel 100 simultaneously through the stability range display screen. Therefore, the operator or the like can relatively easily determine how to proceed with the particular work for its efficient performance while maintaining a relatively high degree of stability of the shovel 100 more easily.

[Variations and Modifications]

An embodiment of the present invention is described in detail above. The present invention, however, is not limited to the particular embodiment, and various variations and modifications may be made without departing from the scope of the present invention described in the claims.

For example, while the controller 30 performs operations with respect to the stability range displaying function, the unstable state controlling control function, and the instability log recording function based on the stability range set by the stability range setting part 304 according to the above-described embodiment, the controller 30 may be configured to perform only operations with respect to one or some of the functions. In other words, the controller 30 may be configured to include only at least one of the display control part 305, the unstable state controlling control part 306, and the instability log recording part 307.

Furthermore, while the unstable state controlling function targets the shovel 100 according to the above-described embodiment and variation, the unstable state controlling function may target any construction machine (for example, a demolition machine) as long as the construction machine includes a work element (attachment) that is attached to the upper swing structure 3 and can be operated to move by the operator or the like.

Furthermore, while the shovel 100 is configured to hydraulically drive all of various operating elements such as the lower traveling structure 1, the upper swing structure 3, the boom 4, the arm 5, and the bucket 6 according to the above-described embodiment and variations, one or some of them may be electrically driven. That is, a configuration, etc., disclosed in the above-described embodiment may also be applied to hybrid shovels, electrically powered shovels, etc. In this case, the engine 11 may drive a generator to generate electric power for driving the shovel 100. Furthermore, the above-described movement speed-related information may include, for example, information on the discharge-time output (discharge output) of the electric power accumulator of a hybrid shovel or the power supply of an electrically powered shovel. This is because the output of an assist motor that drives the engine 11 changes or the output of an electric actuator that drives the attachment changes according to the discharge output of the electric power accumulator.

Furthermore, according to the above-described embodiment and variations, the shovel 100 may include a power source other than the engine 111. For example, the power source of the shovel 100 may be an electric power accumulator such as a battery or capacitor or a cable-connected external commercial power supply. In this case, the shovel 100 may be configured such that the main pump 14 is driven by a motor powered by the electric power of the electric power accumulator or commercial power supply, or may be configured such that an electric actuator is driven with the electric power of the electric power accumulator or commercial power supply. Furthermore, for example, the power source of the shovel 100 may be another internal combustion engine. In this case, the other internal combustion engine may drive the main pump 14 or may be configured to drive a generator to generate electric power for driving the shovel 100. Furthermore, the power source of the shovel 100 may be a power generator such as a fuel cell. In this case, the main pump 14 may be driven by a motor powered by the electric power generated by the power generator, or an electric actuator may be driven with the electric power generated by the power generator.

Furthermore, according to the above-described embodiment and variations, a no-restriction range where the movement of the attachment of the shovel 100 is not restricted (an example of the first range) and a restriction range where the movement of the attachment is restricted (an example of the second range) may be specified. For example, when an area where a worker works is predetermined, or when an area where an obstacle such as a utility pole or an electrical wire exists is known in advance, around the shovel 100, the area may be specified in advance as a restriction range. Furthermore, for example, when a predetermined obstacle (for example, a person such as a worker, a utility pole, a material, another construction machine, or a work vehicle) is detected around the shovel 100, a predetermined area adjoining the detected obstacle may be specified as a restriction range. In this case, the same as in the above-described case of the stability range and the instability range, the display device 40 may display the non-restriction range and the restriction range in such a manner that the non-restriction range and the restriction range are distinguishable.

Figure 11:
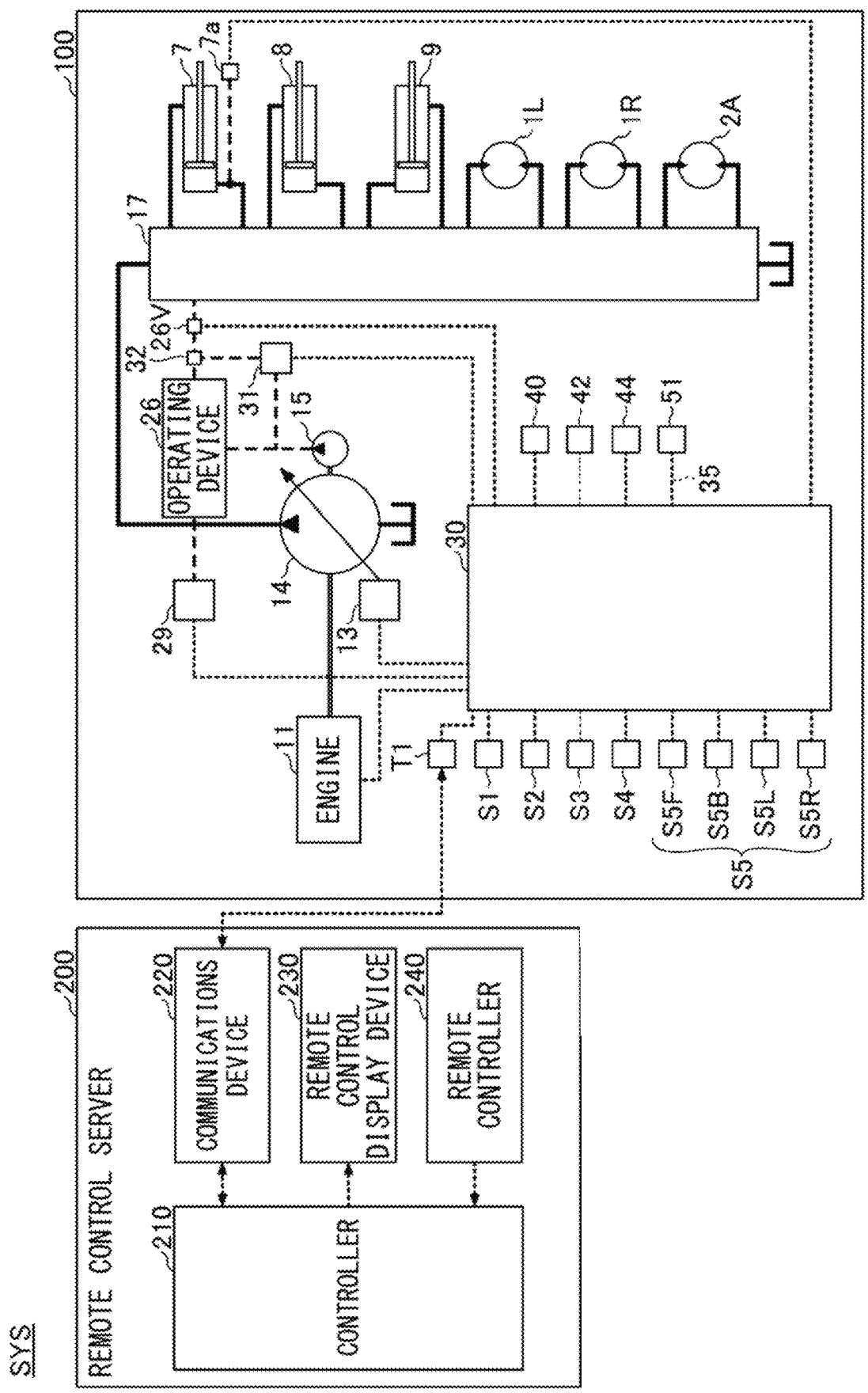
FIG. 11 is a diagram illustrating an example configuration of a shovel remote control system.

Furthermore, according to the above-described embodiment and variations, the shovel 100 may be remotely controlled. For example, FIG. 11 is a diagram illustrating an example configuration of a shovel remote control system SYS. Differences from the above-described embodiment and variations are mainly described below.

The shovel remote control system SYS includes the shovel 100 that is a target of remote control and a remote control server 200.

The shovel 100 includes a communications device T1, the hydraulic pressure control valve 31, and a shuttle valve 32.

The communications device T1 connects to, for example, a predetermined communications network such as a mobile communication network including a base station as a terminal end, a satellite communication network using a communications satellite, or the Internet to communicate with an apparatus external to the shovel 100. This enables the shovel 100 (the controller 30) to communicate with the remote control server 200 through the communications device T1. Specifically, the communications device T1 can receive a signal corresponding to the details of remote control (hereinafter "remote control signal") from the remote control server 200. Furthermore, the communications device T1 can transmit image information representing a situation around the shovel 100, namely, an image captured by the image capturing device S5, to the remote control server 200.

The hydraulic pressure control valve 31 controls the hydraulic pressure of hydraulic oil and outputs hydraulic oil of a predetermined pilot pressure to the secondary side under the control of the controller 30. The hydraulic pressure control valve 31 is, for example, a solenoid proportional valve. Specifically, the controller 30 outputs a control command corresponding to the details of remote control specified by a remote control signal received by the communications device T1 to the hydraulic pressure control valve 31. This enables the hydraulic pressure control valve 31 to output a pilot pressure commensurate with the details of remote control performed in the remote control server 200.

The shuttle valve 32 includes two input ports and one output port. The shuttle valve 32 outputs one of hydraulic oils input to the two input port which one has the higher hydraulic pressure from the output port. The secondary pilot line of the operating device 26 is connected to one of the input ports, and the secondary pilot line of the hydraulic pressure control valve 31 is connected to the other of the input ports of the shuttle valve 32. The output port of the shuttle valve 32 is connected to the control valve 17 (specifically, to the pilot ports of each of control valves) via the pressure reducing valve 26V. This makes it possible to cause a pilot pressure commensurate with the operation details of the operating device 26 to act on the control valve 17 through the shuttle valve 32. Therefore, the control valve 17 can cause a hydraulic actuator to operate according to the operation details of the operating device 26. Furthermore, a pilot pressure commensurate with the details of remote control output from the hydraulic pressure control valve 31 may act on the control valve 17 through the shuttle valve 32. Therefore, the control valve 17 can cause a hydraulic actuator to operate according to the details of remote control performed in the remote control server 200. Furthermore, the pressure reducing valve 26V can restrict the movement of the shovel 100 independent of the operation details of the operating device 26 or the details of remote control under the control of the controller 30.

The remote control server 200 (an example of an information processing apparatus) includes a controller 210, a communications device 220, a remote control display device 230, and a remote controller 240.

The controller 210 performs control associated with various functions of the remote control server 200. The controller 210 may be implemented by desired hardware or a desired combination of hardware and software. For example, the controller 210 is constituted mainly of a computer that includes a CPU, a memory such as a RAM, a secondary storage such as a ROM, and an interface unit for various inputs and outputs. The controller 210 implements various functions by, for example, executing various programs installed in the secondary storage on the CPU.

The communications device 220 connects to, for example, a predetermined communications network such as a mobile communication network including a base station as a terminal end, a satellite communication network using a communications satellite, or the Internet to communicate with an external apparatus. This enables the remote control server 200 to communicate with the shovel 100 through the communications device 220. Specifically, the communications device 220 can transmit a remote control signal corresponding to the details of remote control of the shovel 100 in the remote controller 240 to the shovel 100. Furthermore, the communications device 220 can receive image information representing a situation around the shovel 100, namely, an image captured by the image capturing device S5, from the shovel 100.

The remote control display device 230 displays an image representing a situation around the shovel 100 based on an image captured by the image capturing device S5 of the shovel 100 received by the communications device 220, under the control of the controller 210. This enables an operator who performs remote control (hereinafter "remote control operator") to perform remote control using the remote controller 240 while checking the surroundings of the shovel 100 with an image displayed on the remote control display device 230.

The remote controller 240 is an input part for the remote control operator performing remote control. The remote controller 240 may be a lever the same as the operating device 26 of the shovel 100 or may be in the form of a joystick or a video game controller, for example. The remote controller 240 outputs a remote control signal corresponding to the details of an operation performed by the remote control operator, namely, the details of remote control, to the controller 210, and the remote control signal is transmitted to the shovel 100 through the communications device 220.

Figure 12:
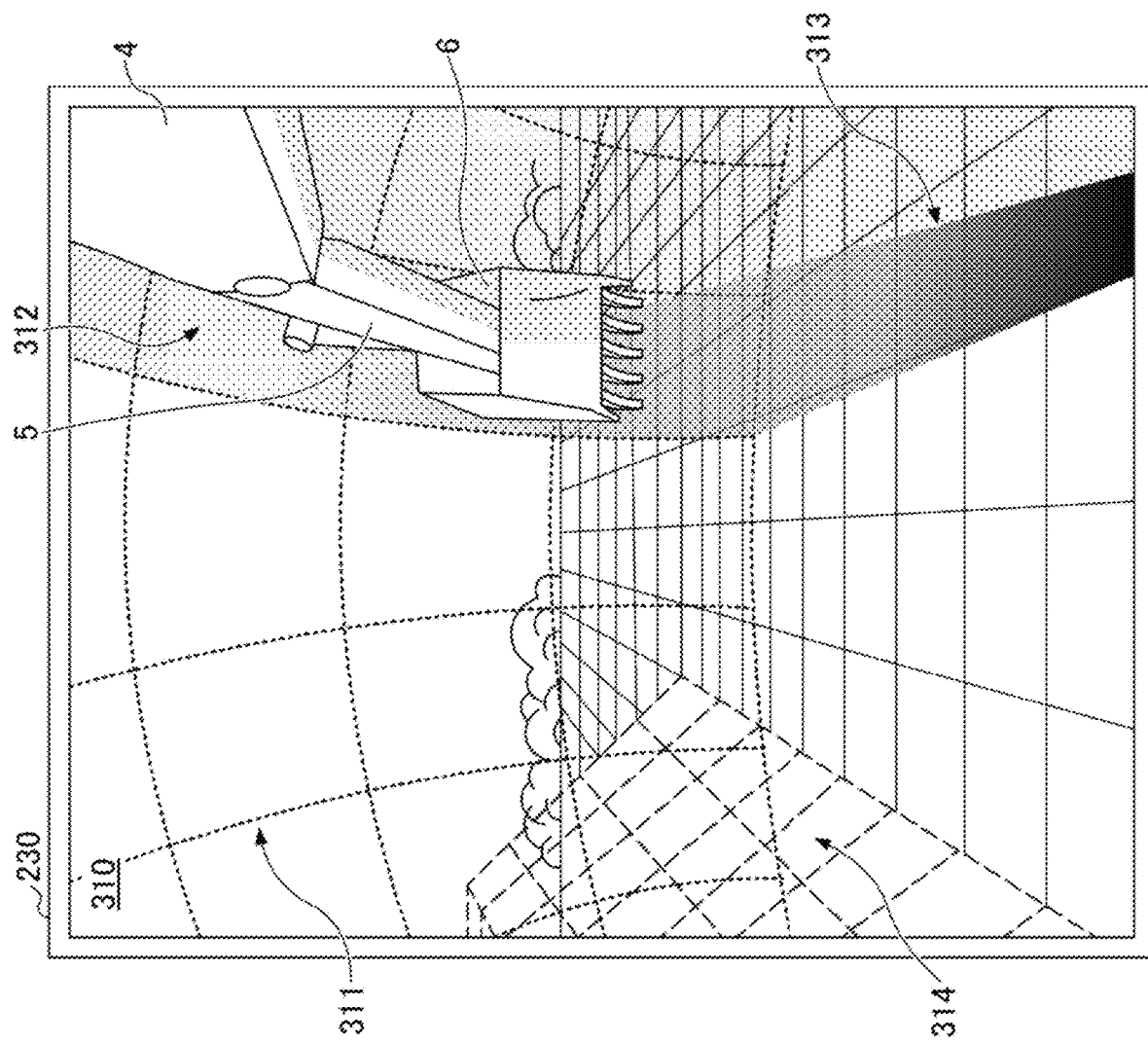
FIG. 12 is a diagram illustrating an example of a display screen of a remote control display device.

For example, FIG. 12 is a diagram illustrating an example of the display screen of the remote control display device 230.

As illustrated in FIG. 12, according to this example, an image looking forward of the shovel 100 including the attachment (the boom 4, the arm 5, and the bucket 6) from inside the cabin 10 (hereinafter "forward image") is displayed on the remote control display device 230. This enables the operator to remotely control the shovel 100, feeling as if the operator were riding in the cabin 10 of the shovel 100.

Furthermore, according to this example, information images 311 through 314 are superimposed and displayed over the forward image on the remote control display device 230.

The information image 311 three-dimensionally shows the reach of the distal end of the attachment, specifically a working part such as the teeth tips or the back surface of the bucket 6, from the current position of the shovel 100, namely, a range within which the attachment can work (hereinafter "working range"), also in view of the swing motion of the upper swing structure 3.

For example, in the case of causing the shovel 100, manually or using a machine control function, to perform sweep work to push away earth or the like forward with the back surface of a bucket, the remote control operator may find it impossible to reach the earth even when attempting to push the earth far away. In this case, the remote work operator cannot proceed with the work as expected before the start of the work, and the work efficiency may therefore be reduced. In contrast, as the working range is displayed in a superimposed manner in the forward field of view of the remote control operator, the remote control operator can intuitively understand to what extent sweep work can be performed with the shovel 100 being at a current position before the start of the work. Therefore, it is possible to increase the work efficiency of the shovel 100.

The information image 312 three-dimensionally shows the operating plane of the attachment (the boom 4, the arm 5, and the bucket 6). This enables the remote control operator to intuitively understand a range where work can be performed with the attachment with the current position of the shovel 100 and the current swing angle of the upper swing structure 3 within a work area around the machine.

The information image 313 three-dimensionally shows an area where the work efficiency of a predetermined work (for example, excavation work) is relatively high (that is, an area where a relatively high excavation force is likely to be output) (hereinafter "high efficiency area") in the operating plane of the attachment. This enables the remote control operator to intuitively understand the highly efficient pose state of the attachment. Therefore, it is possible to encourage the remote control operator to perform work of higher work efficiency to increase the work efficiency of the shovel 100.

Furthermore, the information image 313 shows the relative level of work efficiency within the high efficiency area with gradation. According to this example, gradation that changes from "black" indicating that the work efficiency is relatively low to "white" indicating that the work efficiency is relatively high is employed. This enables the remote control operator to intuitively understand the level of work efficiency within the high efficiency area. Therefore, it is possible to encourage the remote control operator to perform work of higher work efficiency to increase the work efficiency of the shovel 100.

Instead of or in addition to the information image 313, a numerical value of work efficiency (for example, a numerical value of work efficiency corresponding to the current pose of the attachment) may be displayed on the remote control display device 230 under the control of the controller 210. Furthermore, under the control of the controller 210, an area where the work efficiency is relatively high may be displayed in such a manner as to be along the terrain of a work area around (in front of) the shovel 100 as seen from inside the cabin 10 on the remote control display device 230.

The information image 314 three-dimensionally shows an intended finished surface of a slope to be finished (formed) by placing a bank of earth. This enables the remote control operator to intuitively understand three-dimensional data corresponding to the shape of the finished slope while comparing the three-dimensional data with a current terrain shape. Therefore, the remote control operator can efficiently perform earth banking and rolling compaction after earth banking, checking progress by the difference between the current terrain shape and the three-dimensional data of the intended finished surface while looking at the three-dimensional data.

The information image 314 may also be the three-dimensional data of an intended finished surface finished (formed) by excavation, cutting, or the like.

Referring back to FIG. 11, according to this example, the above-described function of the display control part 305, namely, the stability range displaying function, may be transferred to the controller 210 of the remote control server 200. Specifically, the contents of the stability range display screen illustrated in FIGS. 4A through 4D, FIGS. 5A through 5C, FIGS. 6A through 6C, FIG. 7, FIGS. 8A and 8B, and FIG. 9 as described above may be superimposed and displayed over the forward image on the remote control display device 230 under the control of the controller 210. Furthermore, the contents of the stability range display screen illustrated in FIGS. 4A through 4D, FIGS. 5A through 5C, FIGS. 6A through 6C, FIG. 7, FIGS. 8A and 8B, and FIG. 9 as described above may also be displayed a display device different from the remote control display device 230. This enables the remote control operator to enjoy the same operational advantages as in the above-described embodiment. In particular, the remote control operator, while being able to check the surroundings of the shovel 100 through an image displayed on the remote control display device 230, has difficulty in becoming aware of, for example, the pose state of the shovel 100 or an operation that does not cause the tipping of the shovel 100. In contrast, according to this example, the contents of the stability range display screen as described above are displayed on the remote control display device 230 of the remote control server 200, or the like. Therefore, the remote control operator can remotely control the shovel 100 while being aware of the degree of stability of the shovel 100. Therefore, it is possible to increase the safety of the shovel 100 when the shovel 100 is remotely controlled.

Furthermore, according to this example, part of the function of the unstable state controlling control part 306 as described above, specifically, the function of the stability range departure alarm, may be transferred to the controller 210 of the remote control server 200. In this case, the controller 210 may output the stability range departure alarm to the remote control operator through an audio output device (for example, a loudspeaker or a buzzer) or a display device (for example, the remote control display device 230) connected to the remote control server 200.

Furthermore, according to the above-described embodiment and variations, the shovel 100 may perform, for example, autonomous driving. That is, the shovel 100 may be an unmanned vehicle. In this case, it is possible to do an ex-post check on the presence or absence of the operating state of departing from the stability range during autonomous driving, based on the log information recorded by the instability log recording part 307.

What is claimed is:

1. An excavator comprising:
   a lower traveling structure;
   an upper swing structure swingably mounted on the lower traveling structure;
   an attachment attached to the upper swing structure; and
   a display device configured to display a plurality of ranges including a first range and a second range in a top view looking at the upper swing structure from above such that the plurality of ranges are distinguishable, the first range being a working range where a distal end of the attachment is movable without causing an unstable state of the excavator, the second range being outside the first range and lower in stability degree than the first range, wherein the display device is configured to display the plurality of ranges together with an image, the image indicating a position of the distal end of the attachment and changing in response to an operation of the attachment by an operator, in such a manner as to enable the operator to understand a positional relationship between the position of the distal end of the attachment and a boundary between the first range and the second range in the top view.

2. The excavator as claimed in claim 1, where the stability degree indicates a degree of unlikelihood of an occurrence of the unstable state of the excavator, the unstable state including at least one of a state where the lower traveling structure slips relative to a ground, a state where a part of the lower traveling structure is lifted from the ground, and a vibration of the upper swing structure caused by a movement of the attachment.

3. The excavator as claimed in claim 1, wherein the display device is configured to display the plurality of ranges such that the boundary between the first range and the second range moves toward or away from the excavator according to a change in at least one of a load at the distal end of the attachment, a tilt state of the excavator, and a swing angle of the upper swing structure relative to the lower traveling structure.

4. The excavator as claimed in claim 1, wherein the display device is configured to display the plurality of ranges in view of information on a tendency of an operation of the excavator by the operator or information on a movement speed of the attachment.

5. The excavator as claimed in claim 1, further comprising:
an input device configured to receive an operation for setting an item regarding a load at the distal end of the attachment, the item including at least one of a type of an end attachment and earth quality of a work site; and
a hardware processor configured to set the item in response to the operation on the input device,
wherein the display device is configured to display the plurality of ranges in view of setting details of the item set by the hardware processor.

6. The excavator as claimed in claim 1, wherein the display device is configured to display the plurality of ranges together with an image showing an orientation of the lower traveling structure and the upper swing structure.

7. An information processing apparatus comprising:
a display device configured to display, with respect to an excavator including a lower traveling structure, an upper swing structure swingably mounted on the lower traveling structure, and an attachment attached to the upper swing structure, a plurality of ranges including a first range and a second range in a top view looking at the upper swing structure from above such that the plurality of ranges are distinguishable, the first range being a working range where a distal end of the attachment is movable without causing an unstable state of the excavator, the second range being outside the first range and lower in stability degree than the first range,
wherein the display device is configured to display the plurality of ranges together with an image, the image indicating a position of the distal end of the attachment and changing in response to an operation of the attachment by an operator, in such a manner as to enable the operator to understand a positional relationship between the position of the distal end of the attachment and a boundary between the first range and the second range in the top view.

8. The excavator as claimed in claim 1, wherein the display device is configured to superimpose and display the plurality of ranges over a captured image of an area surrounding the excavator, a viewpoint change image generated from the captured image, or a background image including a computer-generated graphic that imitates a work site.

9. The excavator as claimed in claim 1, further comprising:
a hardware processor configured to record log information, in response to a departure of the position of the distal end of the attachment from the first range.

10. The excavator as claimed in claim 1, further comprising:
a hardware processor configured to change a setting of a standard for the stability degree with respect to a manner of displaying the plurality of ranges.

11. The excavator as claimed in claim 1, wherein the display device is further configured to display the plurality of ranges in a side view looking at the excavator from a side.

12. The excavator as claimed in claim 1, wherein the display device is configured to change the boundary between the plurality of ranges based on sensing information, control information, or setting information on a state of the excavator.

13. The excavator as claimed in claim 12, wherein
the sensing information is sensing information regarding a load at the distal end of the attachment, sensing information regarding an orientation of the upper swing structure relative to the lower traveling structure, sensing information regarding a tilt state of a machine body of the excavator, sensing information regarding a movement of the attachment, sensing information regarding an operating state of a power source of the excavator, sensing information regarding an operating state of a hydraulic pump serving as a hydraulic source of a hydraulic actuator of the excavator, or sensing information regarding an operating state of the excavator,
the control information is control information regarding the operating state of the power source or control information regarding the operating state of the hydraulic pump, and
the setting information is setting information regarding a type of the attachment, setting information regarding earth quality of a work site of the excavator, setting information regarding the operating state of the power source, setting information for identifying the operator of the excavator, setting information regarding an attribute of the operator of the excavator, or setting information regarding a tendency of operation of the operator of the excavator.

14. The excavator as claimed in claim 1, wherein the display device is configured to change a display content with respect to the plurality of ranges according to a setting input received from a user.

15. The excavator as claimed in claim 14, wherein the display content is a boundary between the plurality of ranges, representation of a distinction between the plurality of ranges, or a position of a viewpoint from which the plurality of ranges are viewed.

16. The information processing apparatus as claimed in claim 7, further comprising:
a communications device configured to communicate with the excavator; and
an operating device for operating the excavator through the communications device.

* * * * *